(12) United States Patent
Bloemendaal

(10) Patent No.: US 11,267,664 B1
(45) Date of Patent: Mar. 8, 2022

(54) BIN SWEEP SYSTEM WITH DRIVE APPARATUS HAVING ENHANCED SLIPPAGE CAPABILITY

(71) Applicant: SIOUX STEEL COMPANY, Sioux Falls, SD (US)

(72) Inventor: Brent J. Bloemendaal, Zionsville, IN (US)

(73) Assignee: Sioux Steel Company, Sioux Falls, SD (US)

( * ) Notice: Subject to any disclaimer, the term of this patent is extended or adjusted under 35 U.S.C. 154(b) by 216 days.

(21) Appl. No.: 16/804,111

(22) Filed: Feb. 28, 2020

Related U.S. Application Data

(60) Provisional application No. 62/815,748, filed on Mar. 8, 2019.

(51) Int. Cl.
*B65G 65/42* (2006.01)

(52) U.S. Cl.
CPC ...... *B65G 65/425* (2013.01); *B65G 2201/042* (2013.01); *B65G 2811/09* (2013.01); *B65G 2812/02089* (2013.01)

(58) Field of Classification Search
CPC ............. B65G 65/425; B65G 65/4836; B65G 65/4845; B65G 2811/09; B65G 2812/02089; B65G 2812/011; A01D 69/08; F16D 25/04; F16C 41/001; F16C 2361/43
See application file for complete search history.

(56) References Cited

U.S. PATENT DOCUMENTS

| | | | |
|---|---|---|---|
| 822,547 A | 6/1906 | Nicolson |
| 2,646,023 A | 7/1953 | Virgil |
| 2,722,305 A | 11/1955 | McCabe |
| 2,763,362 A | 9/1956 | Greaves |
| 2,801,137 A | 7/1957 | Clay |
| 3,014,575 A | 12/1961 | Klein |
| 3,035,718 A | 5/1962 | Behlen |
| 3,065,996 A | 11/1962 | Patz |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

G & G Manufacturing SC-X4 Ratchet Slip Clutches.

(Continued)

*Primary Examiner* — Glenn F Myers
(74) *Attorney, Agent, or Firm* — Jeffrey A. Proehl; Woods, Fuller, Shultz & Smith, PC

(57) ABSTRACT

A storage bin sweep system may include a sweep apparatus with a particulate material moving assembly configured to move particulate material toward an inboard end of the sweep apparatus and a drive unit carrying a portion of the particulate material moving assembly. The drive unit may include a surface engaging element configured to engage a surface below the sweep assembly to move the sweep apparatus with respect to the surface and a drive train configured to transmit power to the surface engaging element. The drive train may include a clutch assembly configured to transfer rotation utilizing a viscous fluid to permit a limited degree of slippage between elements of the drive train.

17 Claims, 22 Drawing Sheets

(56) References Cited

U.S. PATENT DOCUMENTS

| | | | |
|---|---|---|---|
| 3,067,914 A | 12/1962 | Ellaby |
| 3,175,676 A | 3/1965 | Schaaf |
| 3,181,715 A | 5/1965 | Olson |
| 3,204,786 A | 9/1965 | Kucera |
| 3,228,514 A | 1/1966 | Kucera |
| 3,229,665 A | 1/1966 | Baltz |
| 3,229,827 A | 1/1966 | Kucera |
| 3,231,106 A | 1/1966 | Bruecker |
| 3,291,325 A | 12/1966 | Henningson |
| 3,297,146 A | 1/1967 | Munger |
| 3,338,636 A | 8/1967 | Chapman |
| 3,438,517 A | 4/1969 | Steffen |
| 3,451,567 A | 6/1969 | Laidig |
| 3,455,470 A | 7/1969 | Kanagy |
| 3,472,357 A | 10/1969 | Strocker |
| 3,486,643 A | 12/1969 | Smith |
| 3,532,232 A | 10/1970 | Sukup |
| 3,647,094 A | 3/1972 | Jackson |
| 3,828,916 A | 8/1974 | Patz |
| 3,838,780 A | 10/1974 | Ridlehuber |
| 3,908,840 A | 9/1975 | Lambert |
| 3,946,496 A | 3/1976 | Sukup |
| 3,946,861 A | 3/1976 | Sandefur |
| 3,974,908 A | 8/1976 | Keichinger |
| 3,986,600 A | 10/1976 | Pentith |
| 4,022,335 A | 5/1977 | Lambert |
| RE29,309 E | 7/1977 | Paiierson |
| RE29,386 E | 9/1977 | Miksitz |
| 4,057,151 A | 11/1977 | Weaver |
| 4,230,222 A | 10/1980 | Clark |
| 4,242,028 A | 12/1980 | Van Dusen |
| 4,313,705 A | 2/1982 | Jackson |
| 4,329,105 A | 5/1982 | Buschbom |
| 4,451,192 A | 5/1984 | Wood |
| 4,516,898 A | 5/1985 | Cantenot |
| 4,578,012 A | 3/1986 | Petit |
| 4,583,903 A | 4/1986 | Hutchison |
| 4,585,385 A | 4/1986 | Buschbom |
| 4,619,330 A | 10/1986 | Machnee |
| 4,619,577 A | 10/1986 | Swanson |
| 4,621,968 A | 11/1986 | Hutchison |
| 4,669,941 A | 2/1987 | West |
| 4,655,666 A | 4/1987 | Cantenot |
| 4,658,911 A | 4/1987 | Drever |
| 4,762,220 A | 8/1988 | Lutke |
| 4,773,808 A | 9/1988 | Fischer |
| 4,775,278 A | 10/1988 | Fischer |
| 4,824,312 A | 4/1989 | Schiltz |
| 4,875,820 A | 10/1989 | Lepp |
| 4,998,855 A | 3/1991 | Tschernatsch |
| 5,088,871 A | 2/1992 | Mellish |
| 5,099,983 A | 3/1992 | Valdez |
| 5,180,272 A | 1/1993 | Campbell |
| 5,186,596 A | 2/1993 | Boucher |
| 5,203,802 A | 4/1993 | Denis |
| 5,540,533 A | 7/1996 | Eskelinen |
| 5,639,200 A | 6/1997 | Jiskoot |
| 5,769,590 A | 6/1998 | Weikel |
| 5,788,055 A | 8/1998 | Stewart |
| 5,944,168 A | 8/1999 | Campbell |
| 5,947,261 A | 9/1999 | Baker |
| 6,017,180 A | 1/2000 | Wilham |
| 6,039,647 A | 3/2000 | Weikel |
| 6,095,742 A | 8/2000 | Campbell |
| 6,203,261 B1 | 3/2001 | South |
| 6,254,329 B1 | 7/2001 | Sukup |
| 6,280,331 B1 | 8/2001 | Tuttlebee |
| 6,281,610 B1 | 8/2001 | Kliman |
| 6,499,930 B1 | 12/2002 | Dixon |
| 6,619,473 B2 | 9/2003 | Romeo |
| 6,640,451 B1 | 11/2003 | Vinarcik |
| 6,672,342 B2 | 1/2004 | Nussbaumer |
| 6,948,902 B2 * | 9/2005 | Hanig ............... B65G 33/32 |
| | | 198/518 |
| 7,210,538 B2 | 5/2007 | Gust |
| 7,544,031 B2 | 6/2009 | Kaeb |
| 7,588,405 B2 | 9/2009 | Johnson |
| 7,967,542 B2 | 6/2011 | Epp |
| 8,657,025 B2 | 2/2014 | Thompson |
| 8,770,388 B1 | 7/2014 | Chaon |
| 9,120,633 B2 | 9/2015 | Ahlen |
| 9,199,807 B1 * | 12/2015 | Schuelke ............ B65G 65/40 |
| 9,288,946 B1 | 3/2016 | Schuld |
| 9,290,335 B1 | 3/2016 | Witt |
| 9,862,545 B2 | 1/2018 | Kaeb |
| 10,220,420 B2 | 3/2019 | Witt |
| 10,227,188 B1 | 3/2019 | Chaon |
| 10,238,042 B2 | 3/2019 | Ahlen |
| 10,442,641 B2 | 10/2019 | Nelson |
| 2004/0146381 A1 | 7/2004 | Hanson |
| 2004/0213650 A1 | 10/2004 | Epp |
| 2005/0254922 A1 * | 11/2005 | Berreau ............ B65G 65/466 |
| | | 414/310 |
| 2005/0263372 A1 | 12/2005 | Hollander |
| 2006/0245864 A1 | 11/2006 | Epp |
| 2006/0285942 A1 | 12/2006 | Fridgen |
| 2009/0041566 A1 | 2/2009 | Lambertini |
| 2010/0239399 A1 | 9/2010 | Hoogestraat |
| 2013/0064629 A1 | 3/2013 | Schuelke |
| 2013/0216341 A1 | 8/2013 | Luster |
| 2015/0225190 A1 | 8/2015 | Witt |
| 2016/0052719 A1 | 2/2016 | Ganzer |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

Sudenga Industries, Inc., Press Release, Nov. 1, 2004.

Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.

Jayas, Digvir S., and Noel DG White. "Storage and drying of grain in Canada: low cost approaches." Food control 14.4 (2003); pp. 255-261.

* cited by examiner

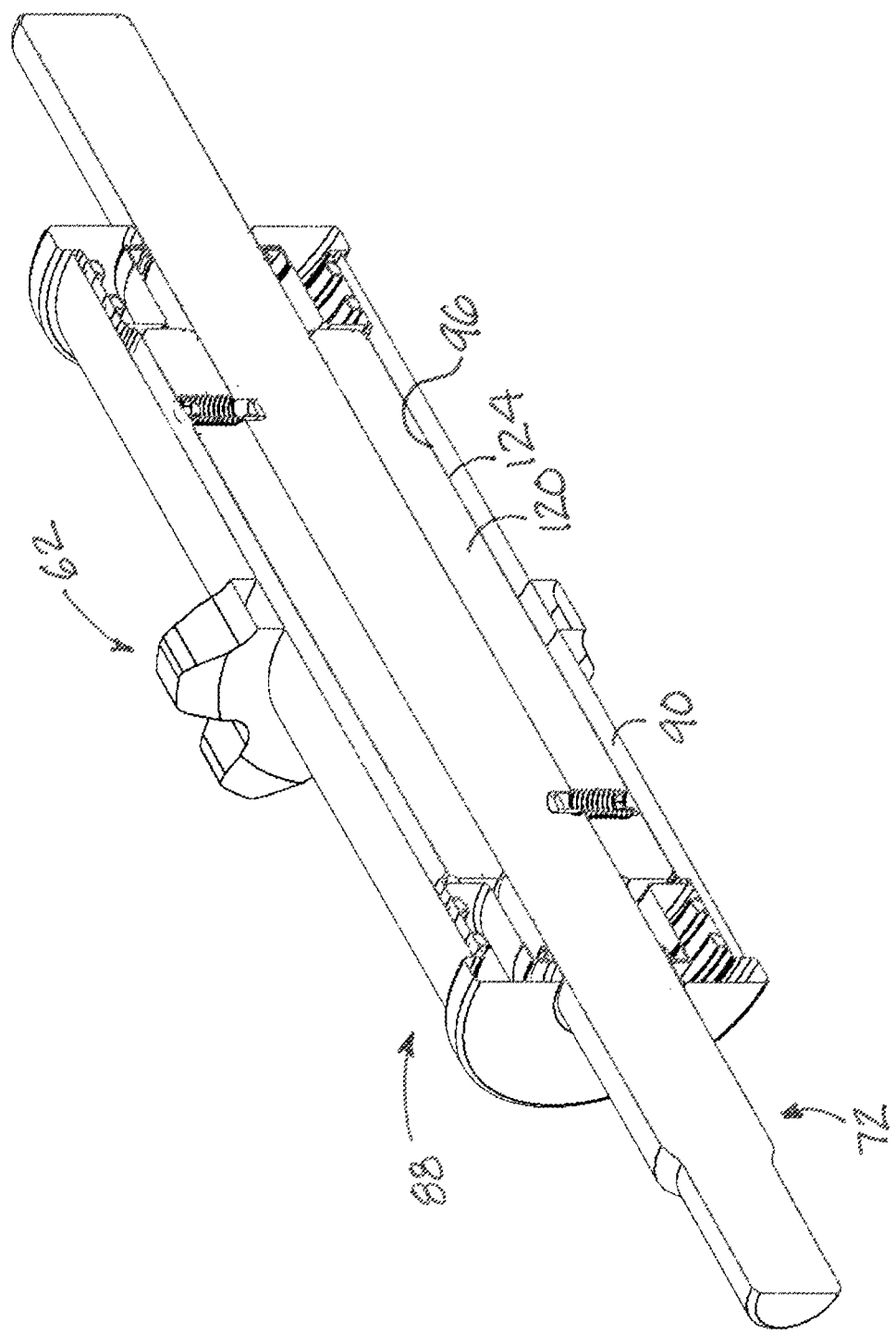

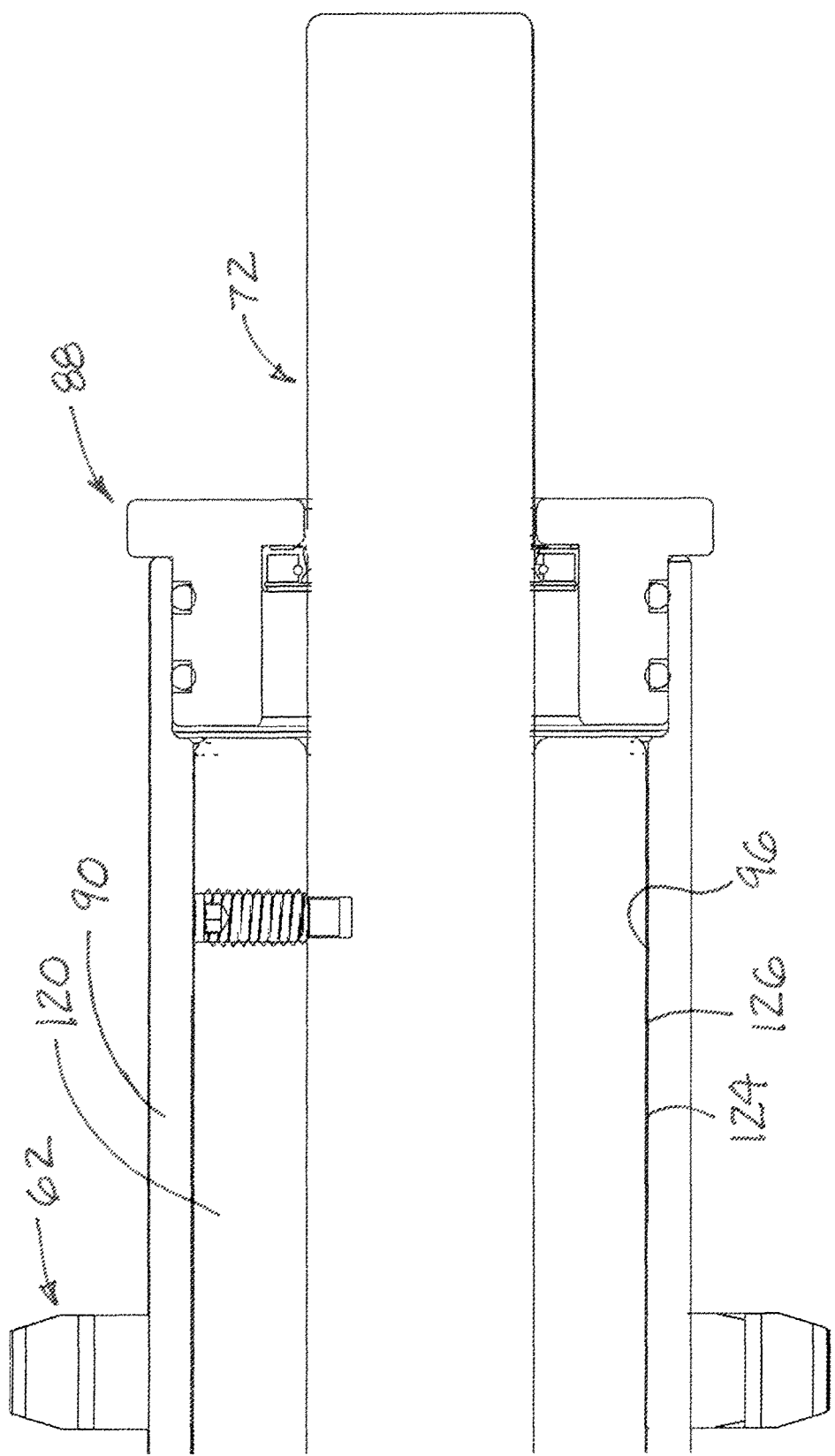

BIN SWEEP SYSTEM WITH DRIVE APPARATUS HAVING ENHANCED SLIPPAGE CAPABILITY

REFERENCE TO RELATED APPLICATIONS

This application claims the benefit of the priority of U.S. Provisional Patent Application No. 62/815,748, filed Mar. 8, 2019, which is hereby incorporated by reference in its entirety.

BACKGROUND

Field

The present disclosure relates to storage bin sweeps and more particularly pertains to a new bin sweep system with drive apparatus having enhanced slippage capability for adapting operation of the drive assembly of the bin sweep to varying bin contents conditions.

SUMMARY

In one aspect, the present disclosure relates to a storage bin sweep system for moving particulate material across a floor surface of a bin. The system may comprise a sweep apparatus including at least two units and having an inboard end for locating toward to a central area of the bin and an outboard end for locating toward a peripheral area of the bin. The sweep apparatus may comprise a particulate material moving assembly configured to move particulate material toward the inboard end of the sweep apparatus, and a drive unit carrying a portion of the particulate material moving assembly. The drive unit may be positioned toward the outboard end of the sweep apparatus with respect to the power unit. The drive unit may comprise a surface engaging element configured to engage a surface below the sweep assembly to move the sweep apparatus with respect to the surface, and a drive train configured to transmit power to the surface engaging element. The drive train may include a clutch assembly configured to transfer rotation utilizing a viscous fluid to permit a limited degree of slippage between elements of the drive train.

In another aspect, the disclosure relates to a storage bin sweep system for moving particulate material across a floor surface of a bin. The system may comprise a sweep apparatus including at least two units and having an inboard end for locating toward to a central area of the bin and an outboard end for locating toward a peripheral area of the bin. The sweep apparatus may comprise a particulate material moving assembly configured to move particulate material toward the inboard end of the sweep apparatus, and a drive unit carrying a portion of the particulate material moving assembly and being positioned toward the outboard end of the sweep apparatus with respect to the inboard end. The drive unit may comprised a housing segment of the drive unit, and a surface engaging element configured to engage a surface below the sweep assembly to move the sweep apparatus with respect to the surface, with the surface engaging element including a rotatable axle mounted on and rotatable with respect to the housing segment of the drive unit. The drive unit may also include a drive train configured to transmit power from the particulate material moving assembly to the surface engaging element. The drive train may include a rotatable shaft rotatably mounted on the housing segment of the drive unit and being in rotational communication with the axle of the surface engaging element such that rotation of the rotatable shaft of the drive train rotates the axle of the surface engaging element. The drive train may also include a rotatable drive member mounted on the rotatable shaft in a manner permitting free rotation of the rotatable drive member with respect to the rotatable shaft, with the rotatable drive member being engaged with the particulate material moving assembly such that the particulate material moving assembly rotates the rotatable drive member. The drive train may further include a clutch assembly for transferring rotation from the rotatable drive member to the rotatable shaft. The clutch assembly may comprise a driver element associated with the rotatable drive member to rotate as a unit with the rotatable drive member, and the driver element may form a driver shell defining a cavity with the cavity being at least partially defined by a driver surface. The clutch assembly may also comprise a driven element associated with the rotatable shaft to rotate as a unit with the rotatable shaft, with the driven element being at least partially positioned in the cavity of the driver element. The driven element may form a driven disc, and the driven disc may have a driven surface positioned in opposition to the driver surface of the driver shell of the driver element. The driver surface of the driver element and the driven surface of the driven element may form a gap in which a viscous fluid is located to tend to cause the driven element to rotate with the driver element to thereby transfer rotational motion of the driver element to the driven element.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 21 is a schematic perspective sectional view of the optional configuration of elements of the drive train of the bin sweep system shown in FIG. 20, according to an illustrative embodiment.

FIG. 22 is a schematic side sectional view of a portion of the optional configuration of elements of the drive train of the bin sweep system shown in FIG. 20, according to an illustrative embodiment.

DETAILED DESCRIPTION

Figure 1:
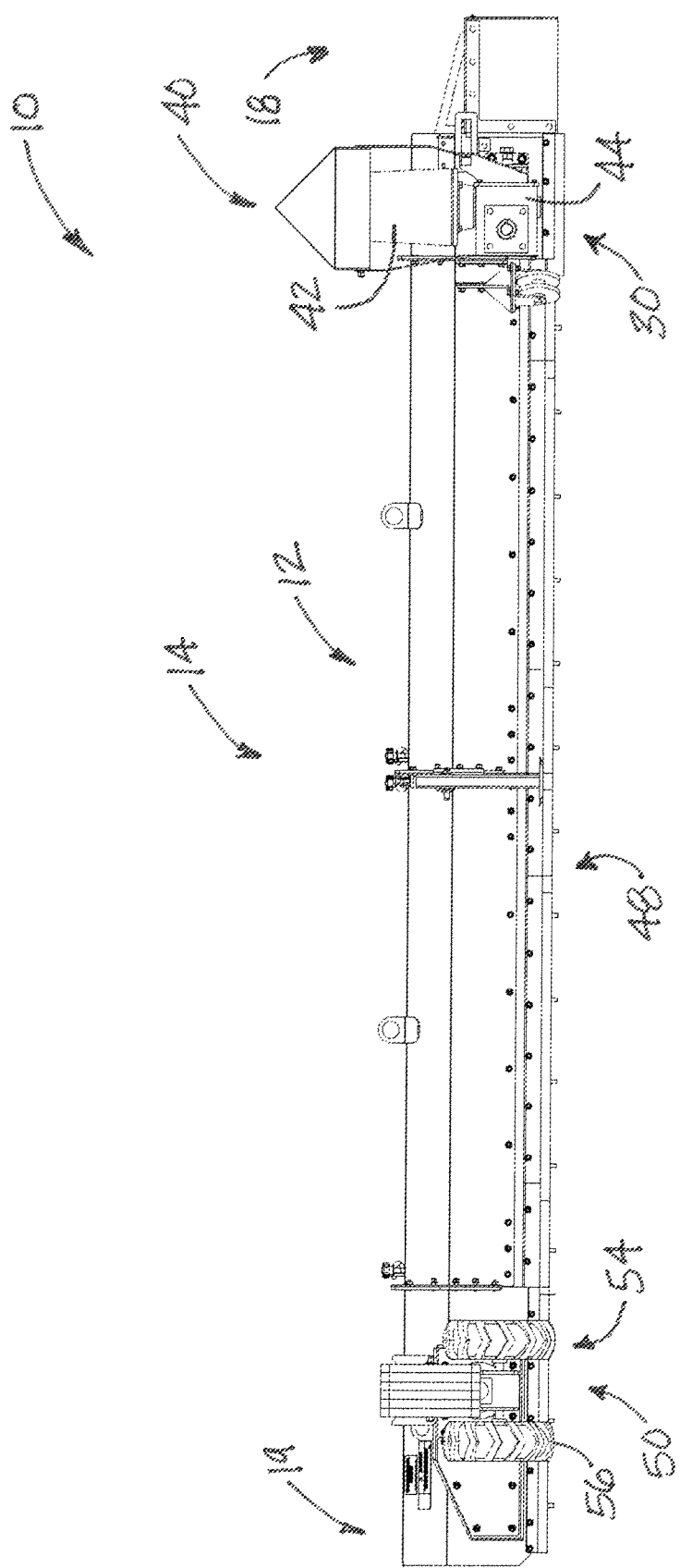
FIG. 1 is a schematic rear view of a new bin sweep system with a drive apparatus having enhanced slippage capability according to the present disclosure.
Figure 2:
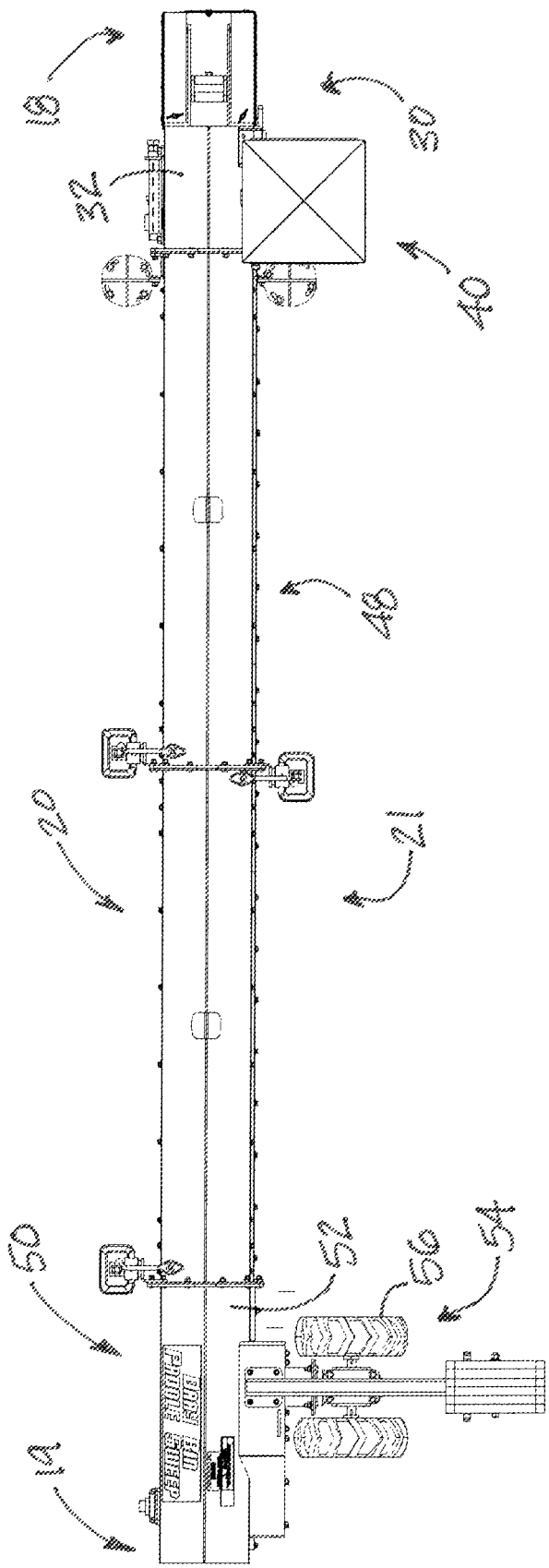
FIG. 2 is a schematic top view of the bin sweep system, according to an illustrative embodiment.
Figure 3:
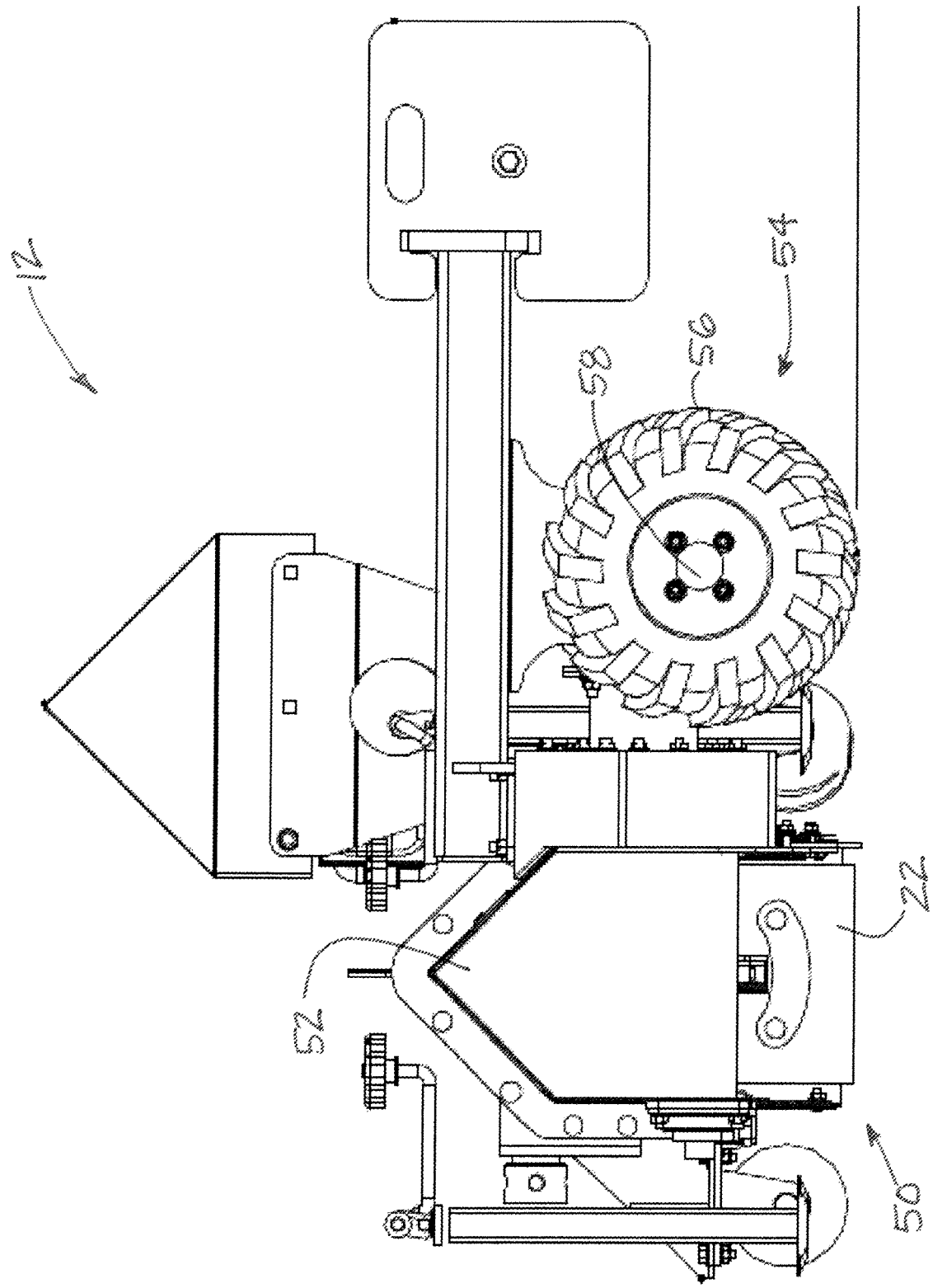
FIG. 3 is a schematic end view of the bin sweep system, according to an illustrative embodiment.
Figure 4:
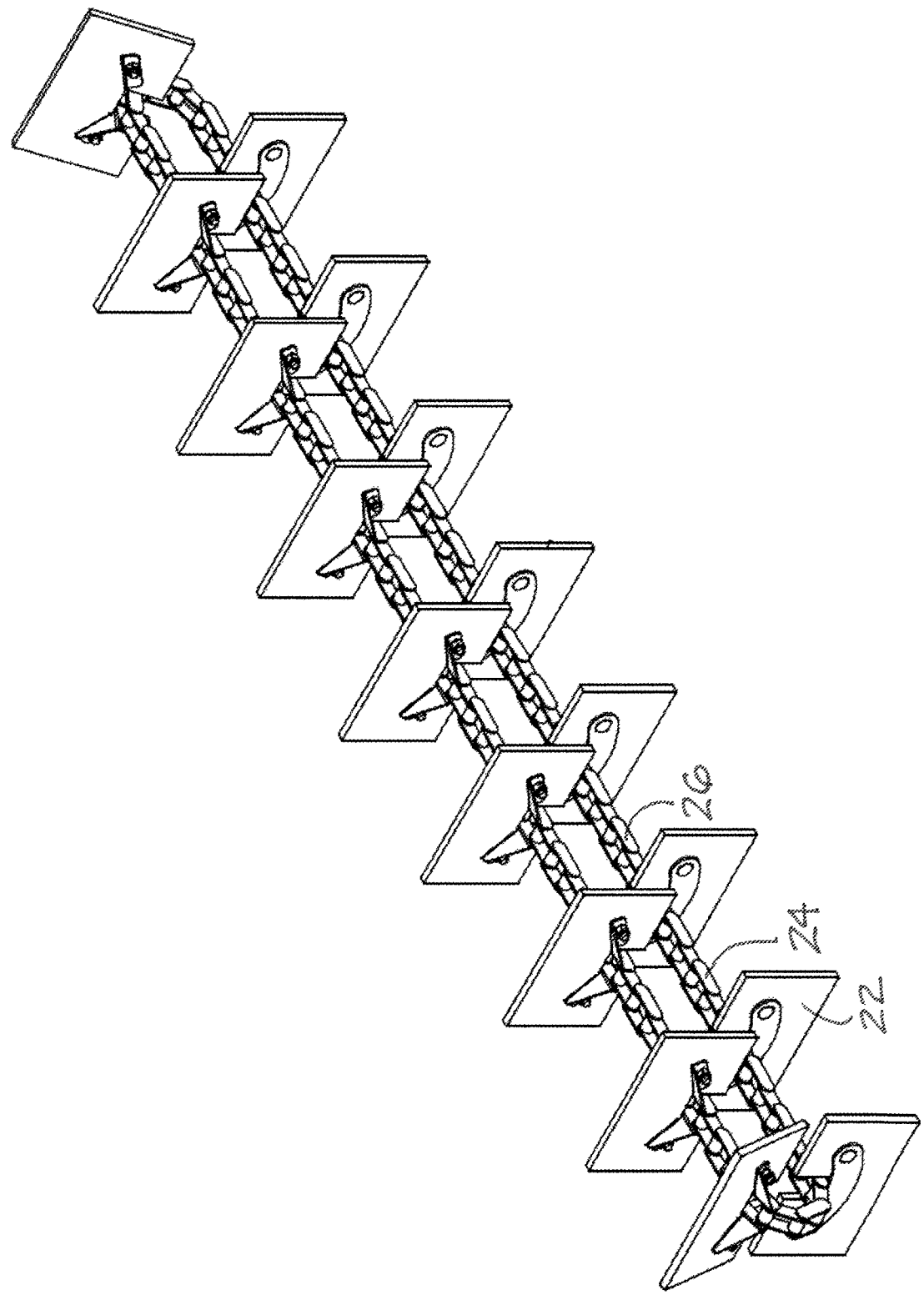
FIG. 4 is a schematic perspective view of the succession of paddles isolated from other elements of the bin sweep system, according to an illustrative embodiment.
Figure 5:
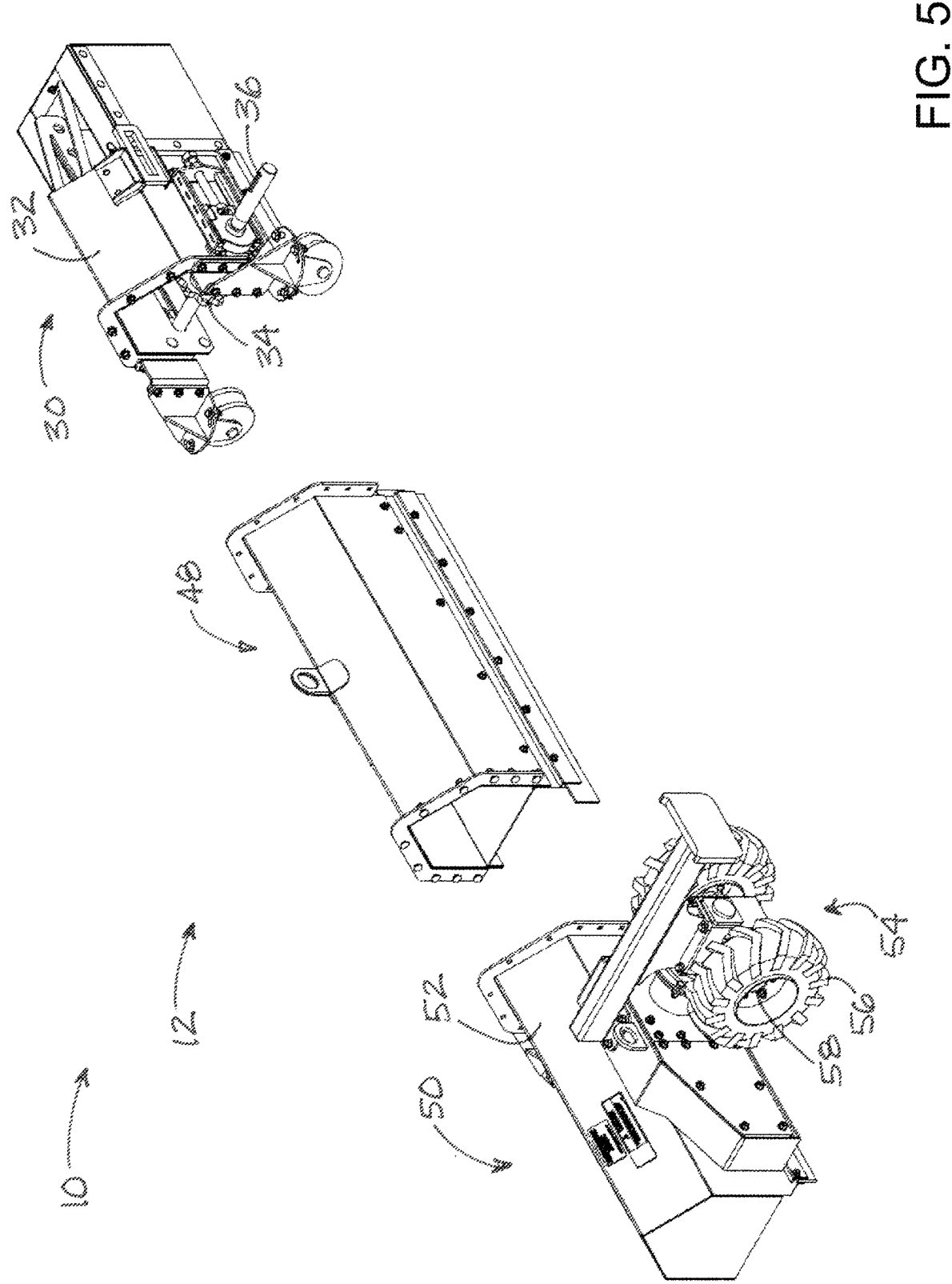
FIG. 5 is a schematic exploded perspective view of units forming the bin sweep system, according to an illustrative embodiment.
Figure 6:
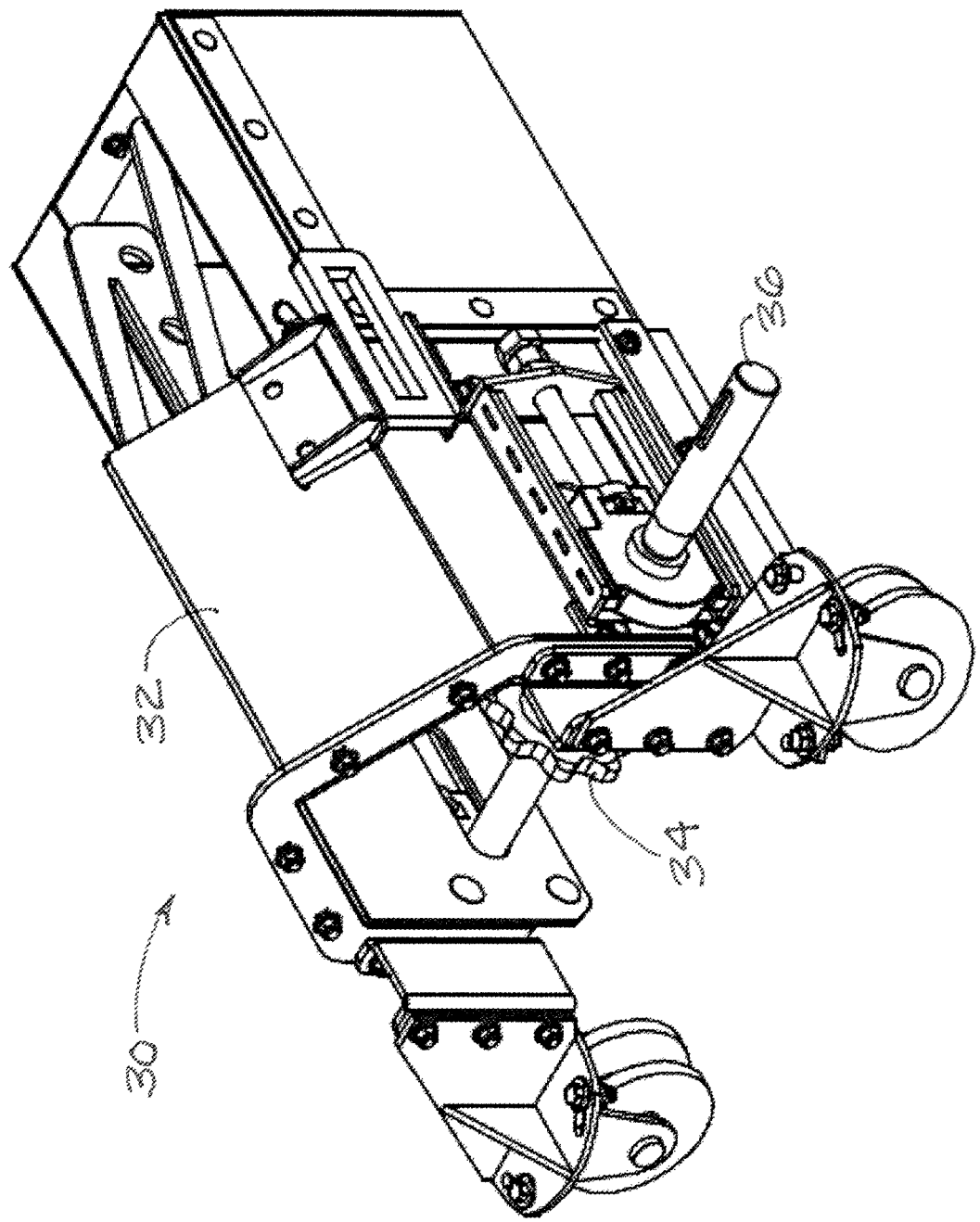
FIG. 6 is a schematic perspective view of elements of the power unit of the bin sweep system isolated from other elements of the system, according to an illustrative embodiment.
Figure 7:
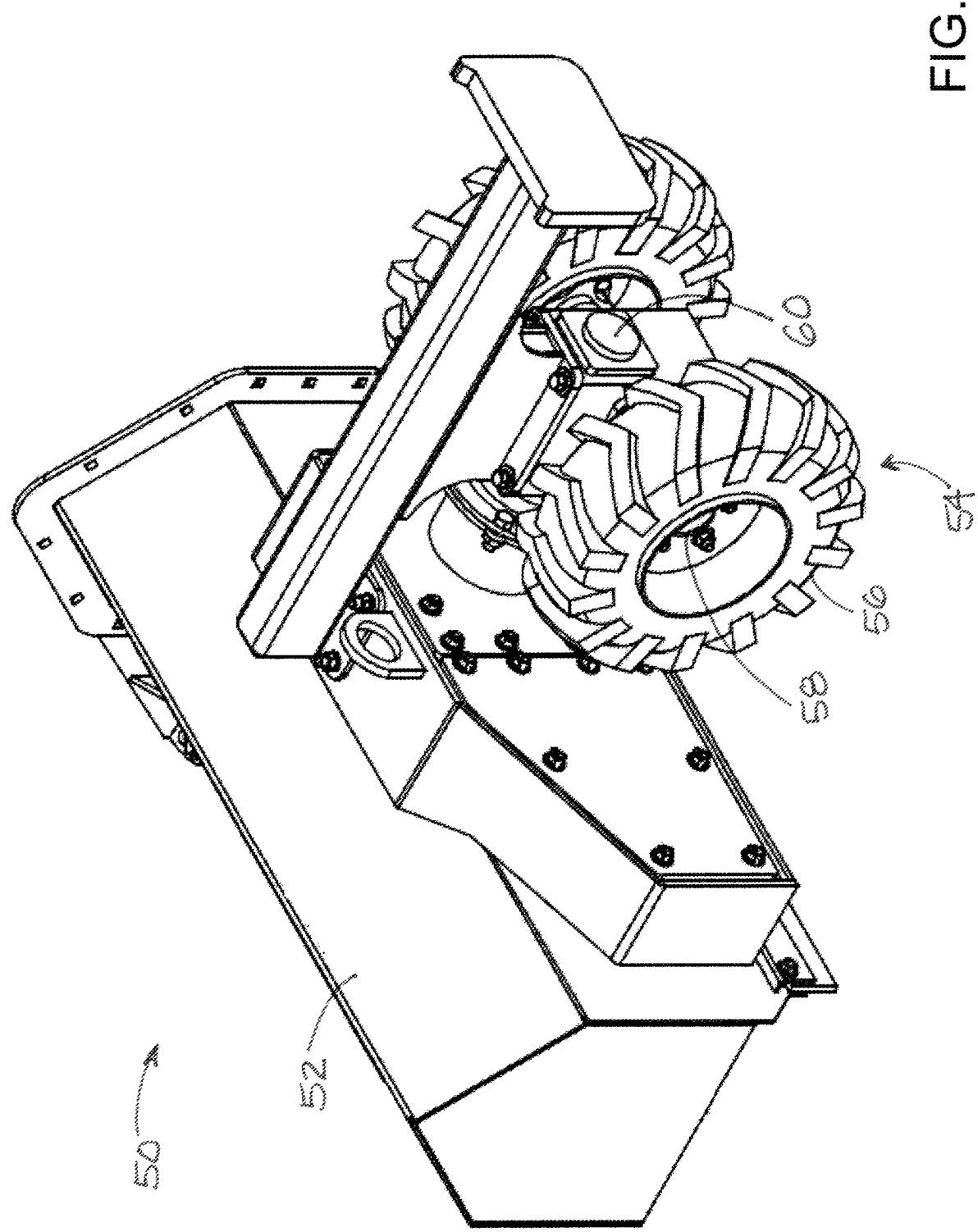
FIG. 7 is a schematic perspective view of elements of the drive unit of the bin sweep system isolated from other elements of the system, according to an illustrative embodiment.
Figure 8:
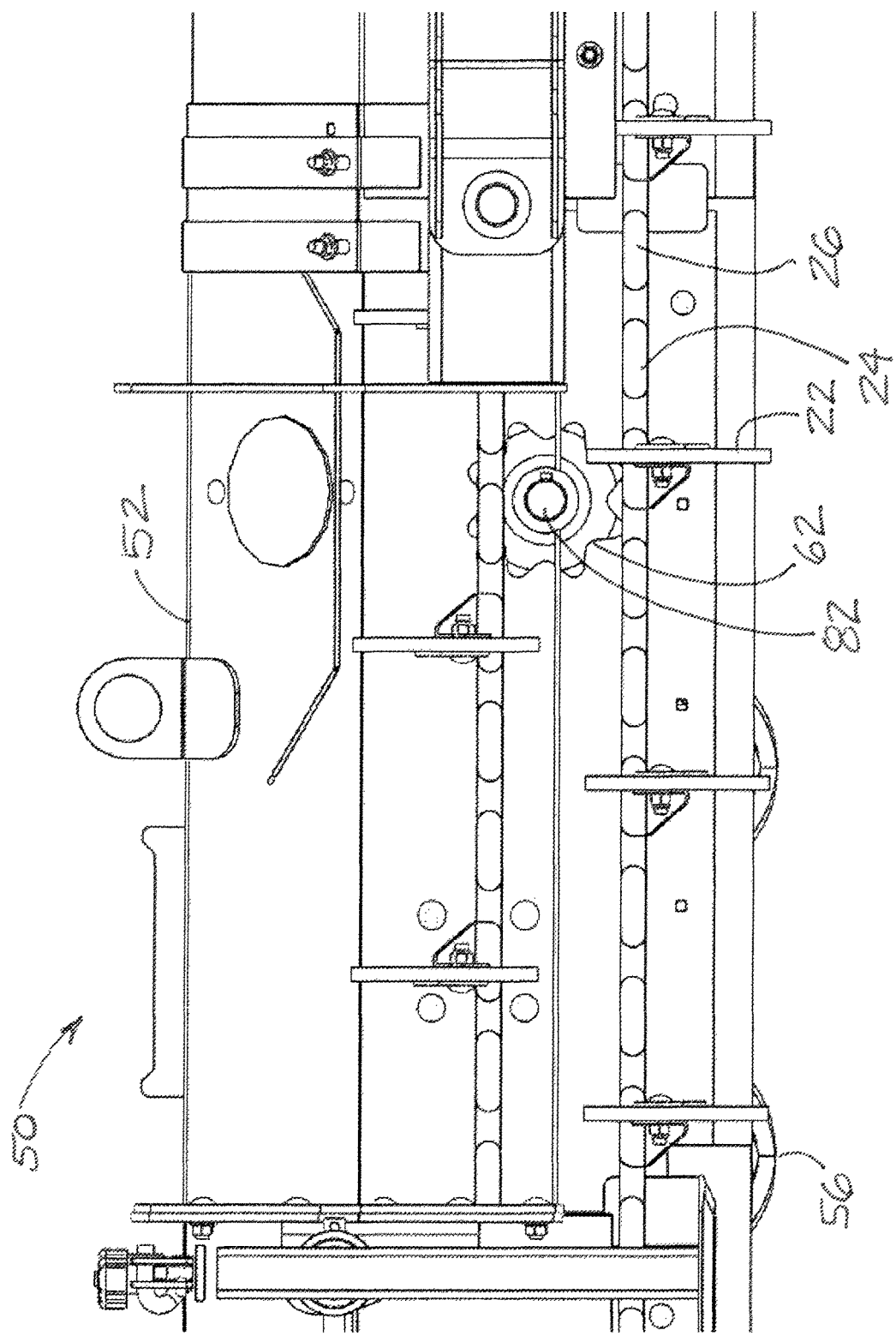
FIG. 8 is a schematic side sectional view of the drive unit of the bin sweep system, according to an illustrative embodiment.
Figure 9:
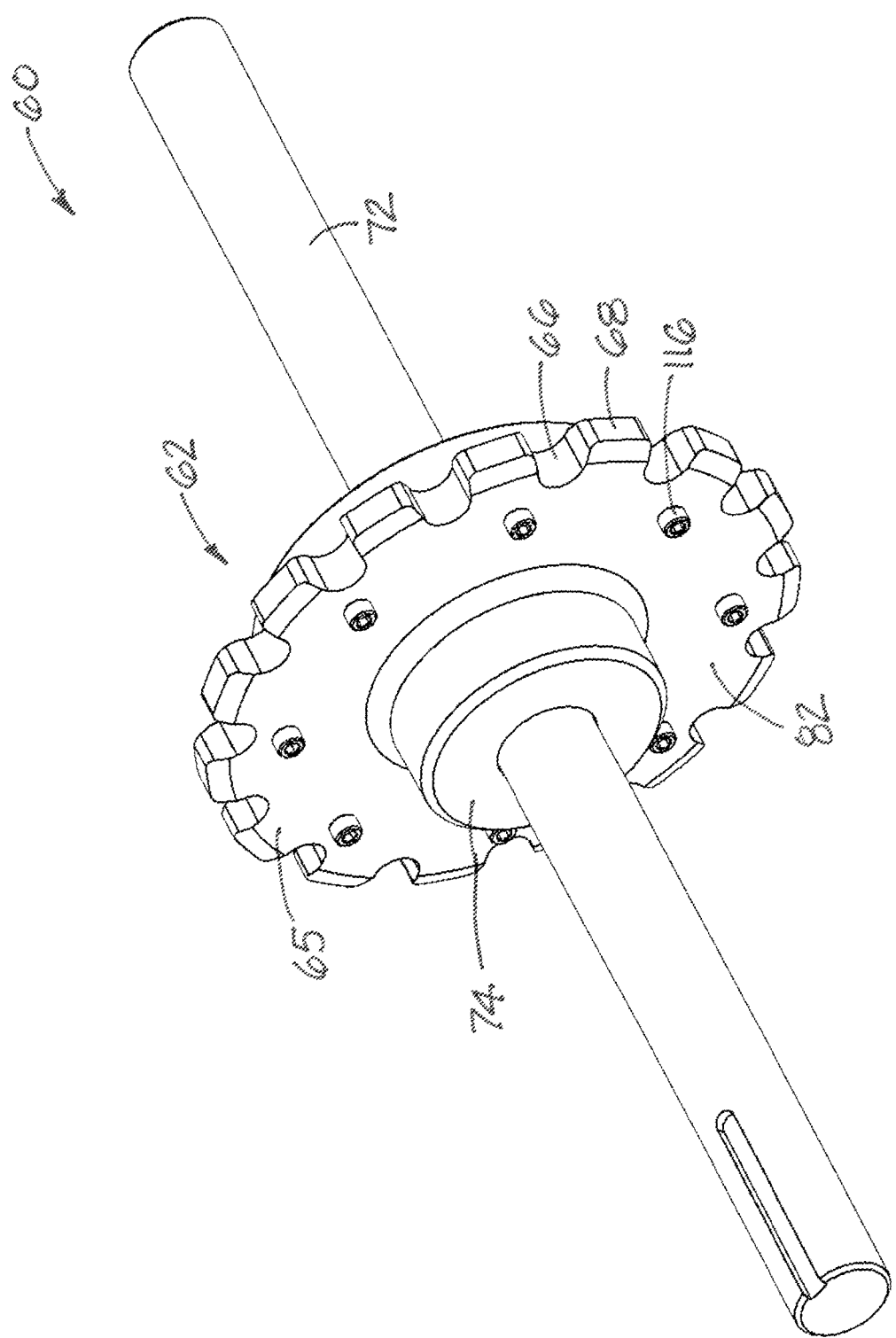
FIG. 9 is a schematic perspective view of elements of the drive train of the bin sweep system including the second rotatable shaft and clutch assembly, according to an illustrative embodiment.
Figure 10:
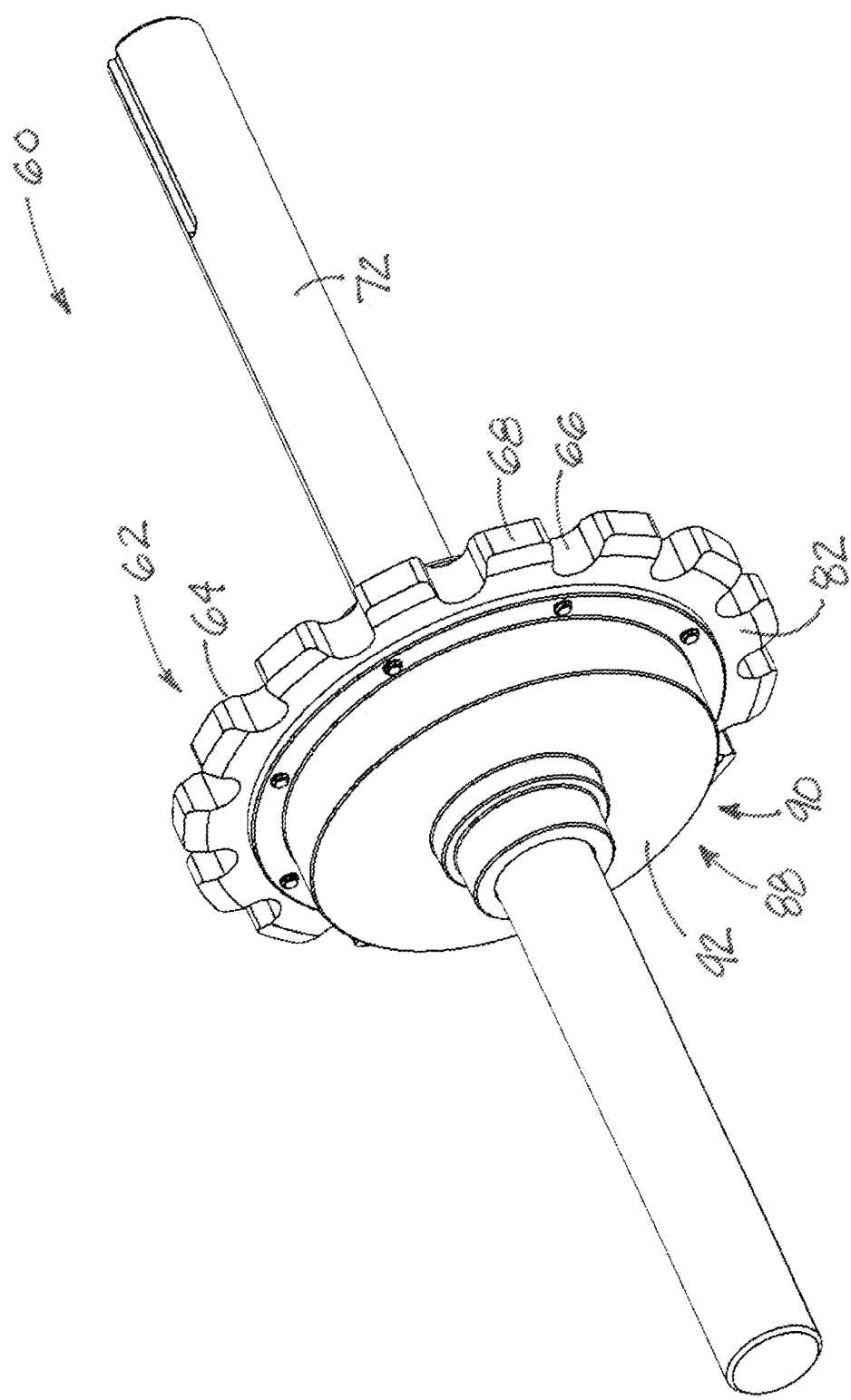
FIG. 10 is a schematic perspective view of elements of the drive train of the bin sweep system including the second rotatable shaft and clutch assembly, according to an illustrative embodiment.
Figure 11:
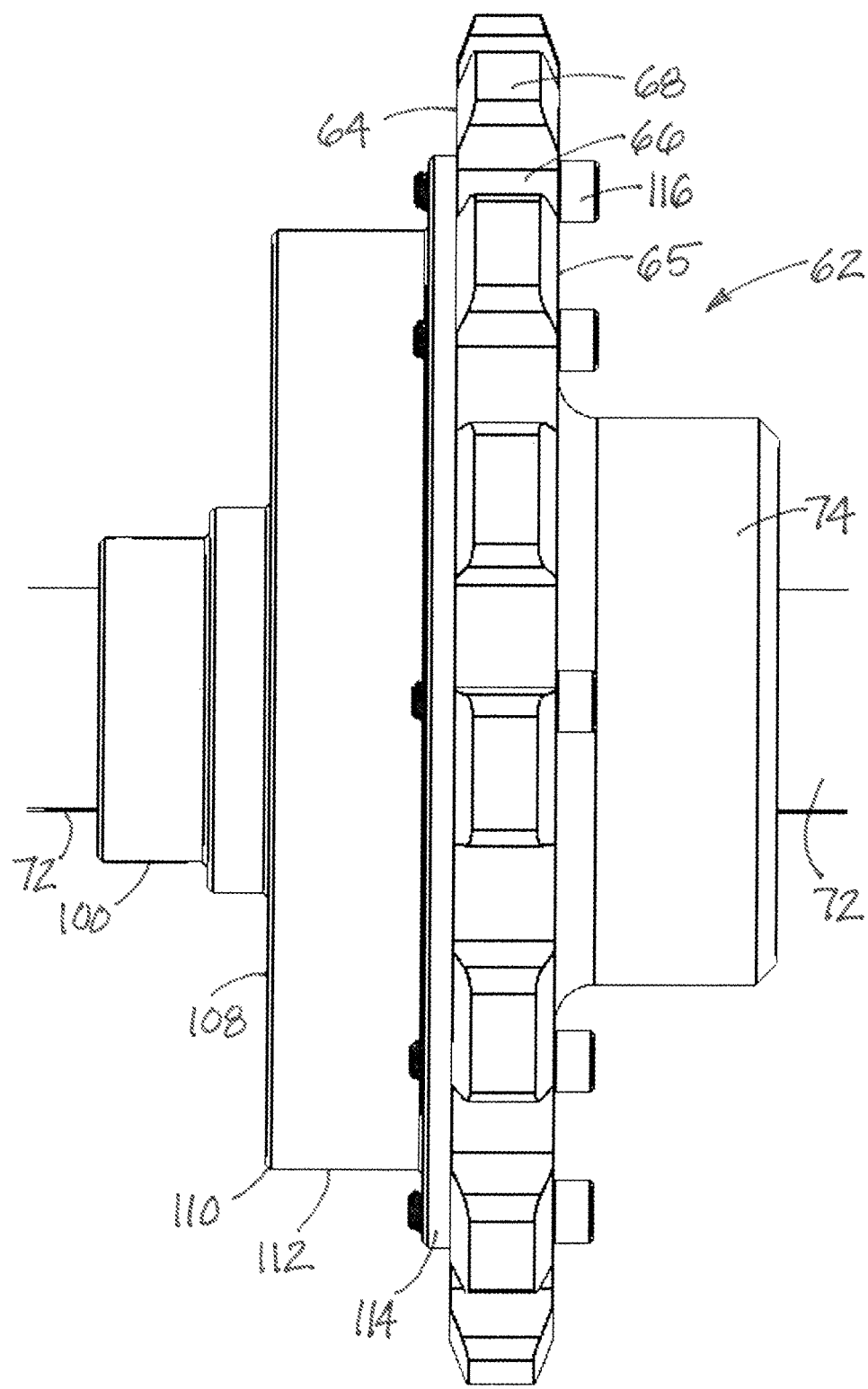
FIG. 11 is a schematic side view of elements of the drive train of the bin sweep system, according to an illustrative embodiment.
Figure 12:
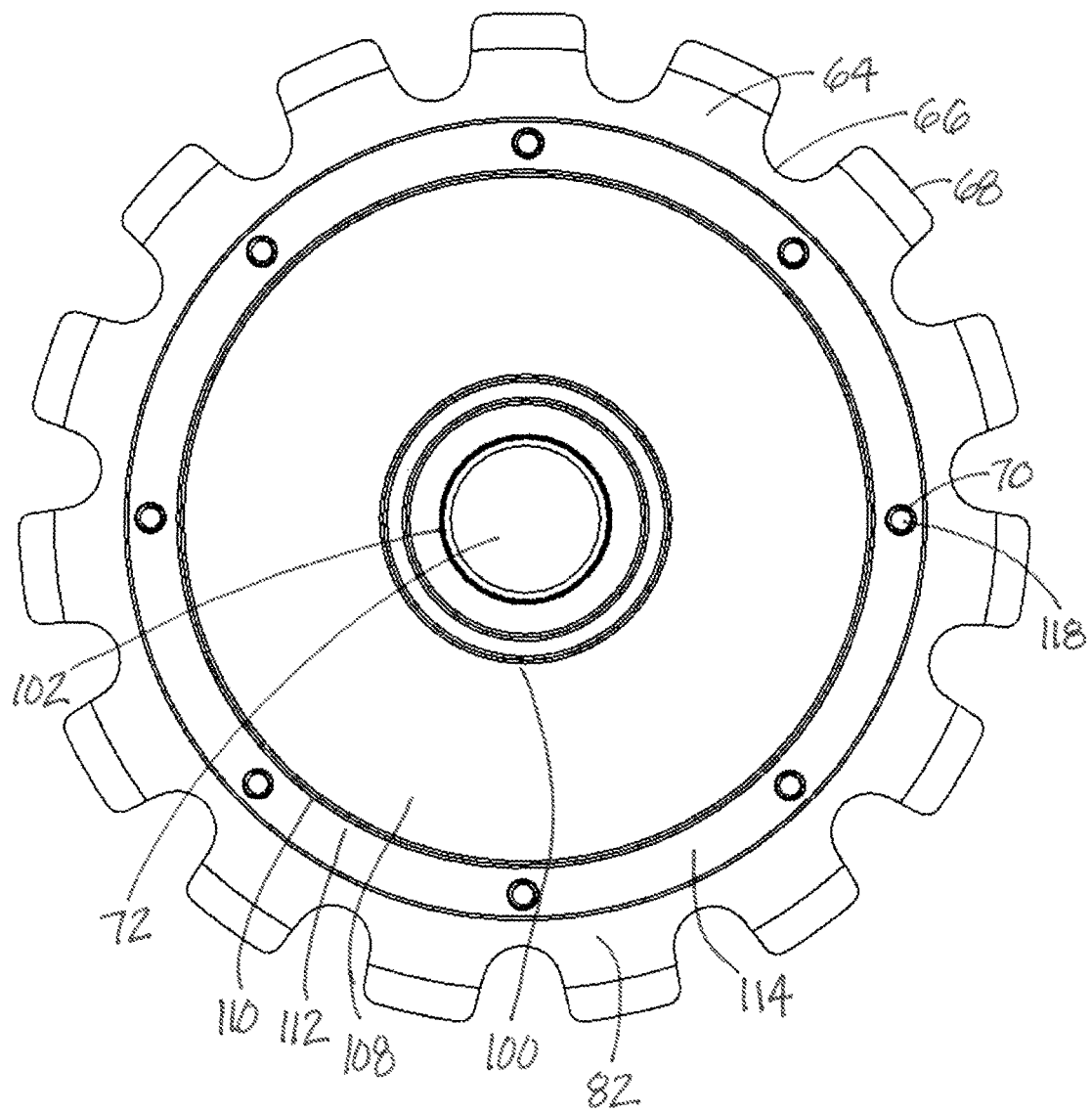
FIG. 12 is a schematic end view of elements of the drive train of the bin sweep system, according to an illustrative embodiment.
Figure 13:
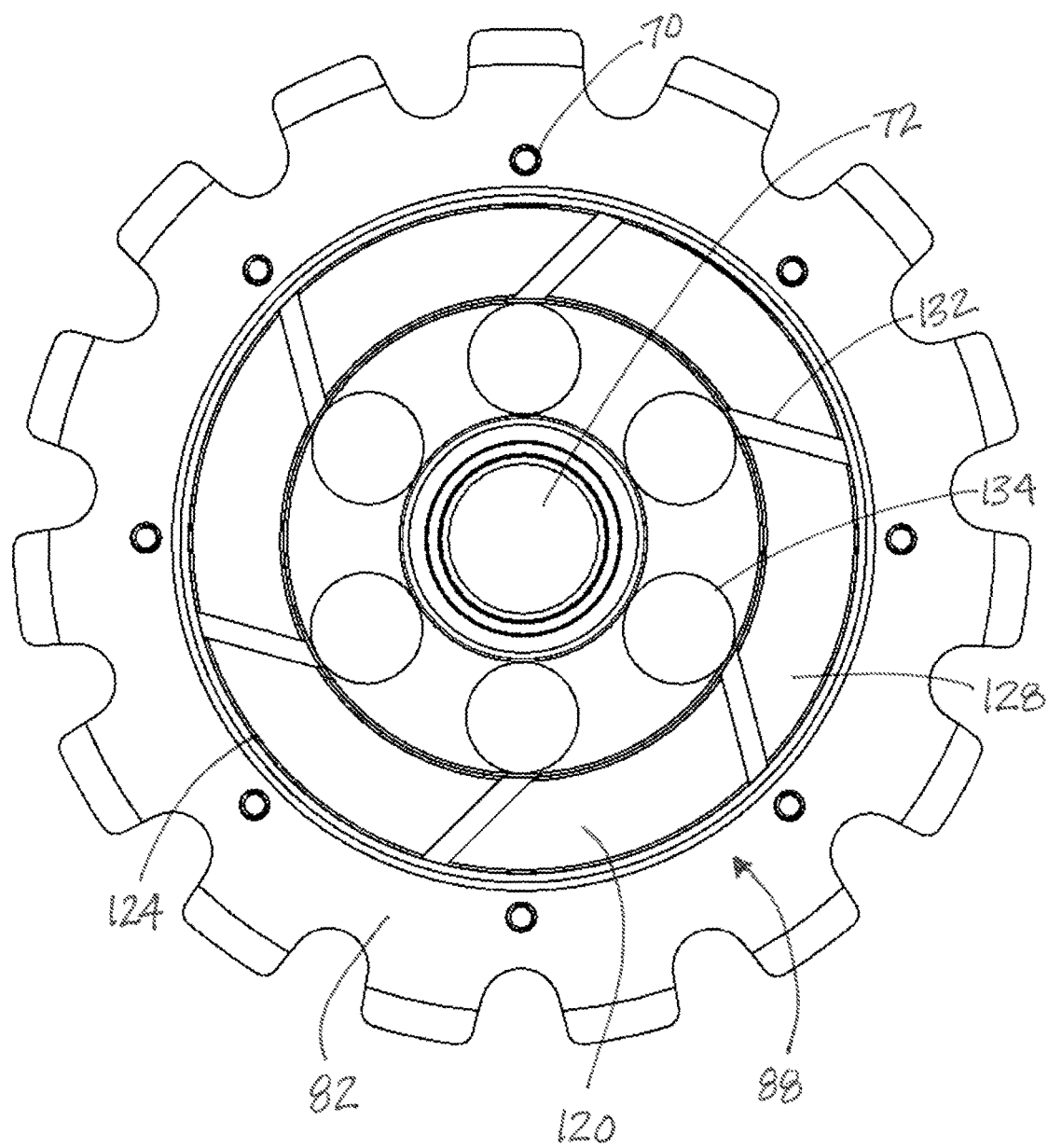
FIG. 13 is a schematic end view of elements of the drive train of the bin sweep system with the driver shell removed to reveal detail of the driven disk, according to an illustrative embodiment.
Figure 14:
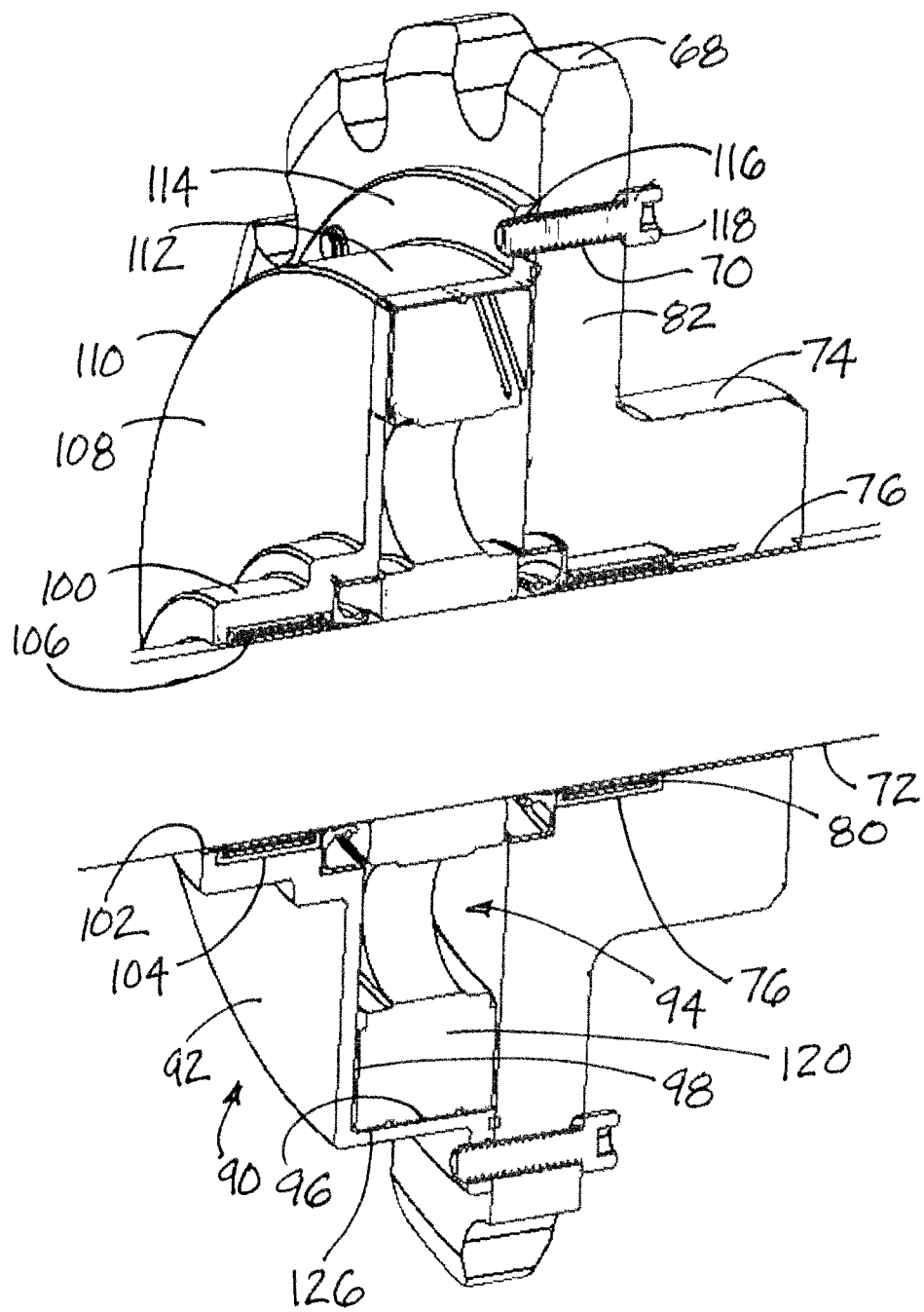
FIG. 14 is a schematic perspective sectional view of elements of the drive train of the bin sweep system including the second rotatable drive member, the second rotatable shaft, and the clutch assembly, according to an illustrative embodiment.
Figure 15:
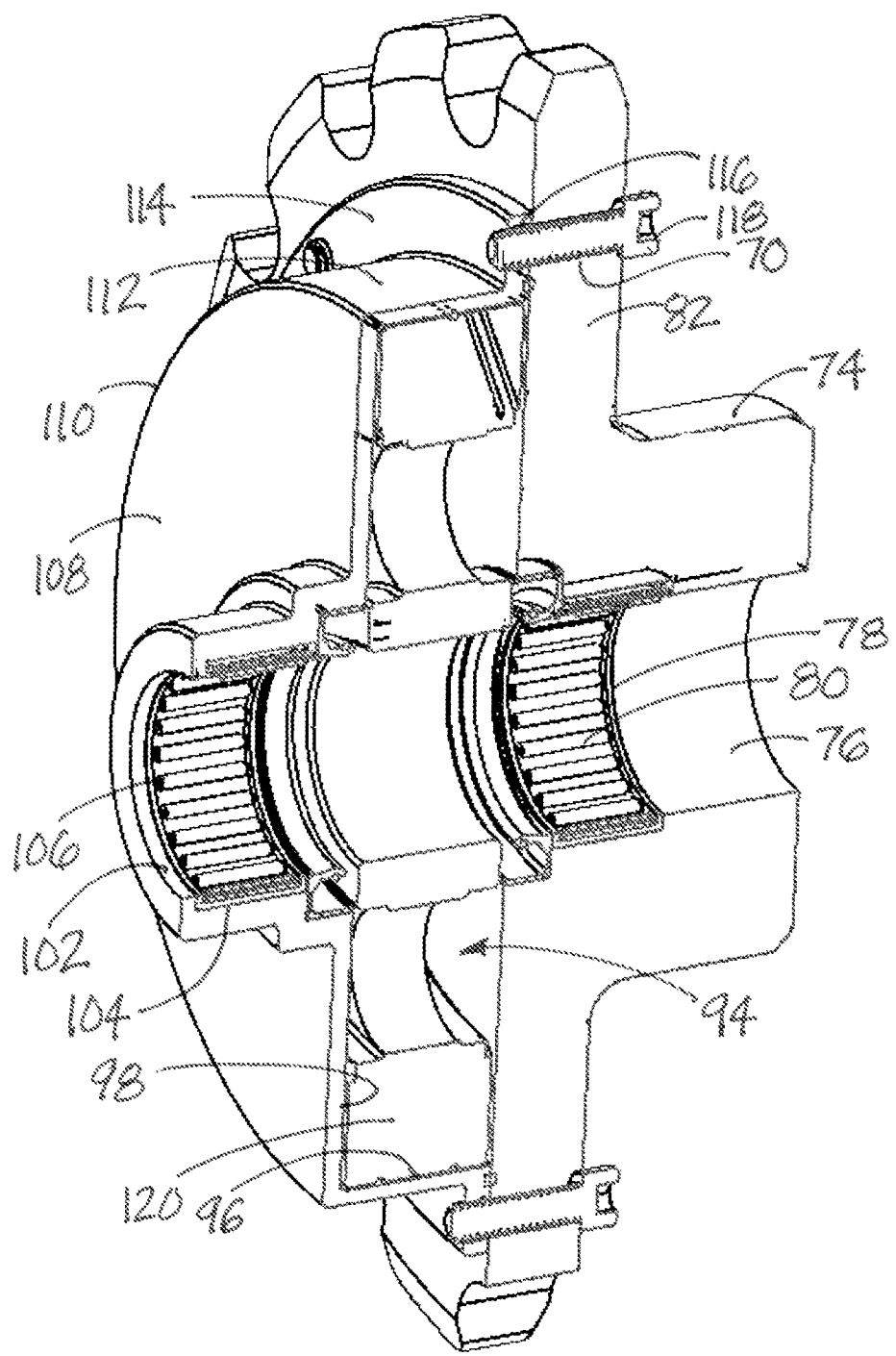
FIG. 15 is a schematic perspective sectional view of elements of the drive train of the bin sweep system including the second rotatable drive member and the clutch assembly with the second rotatable shaft omitted to reveal detail, according to an illustrative embodiment.
Figure 16:
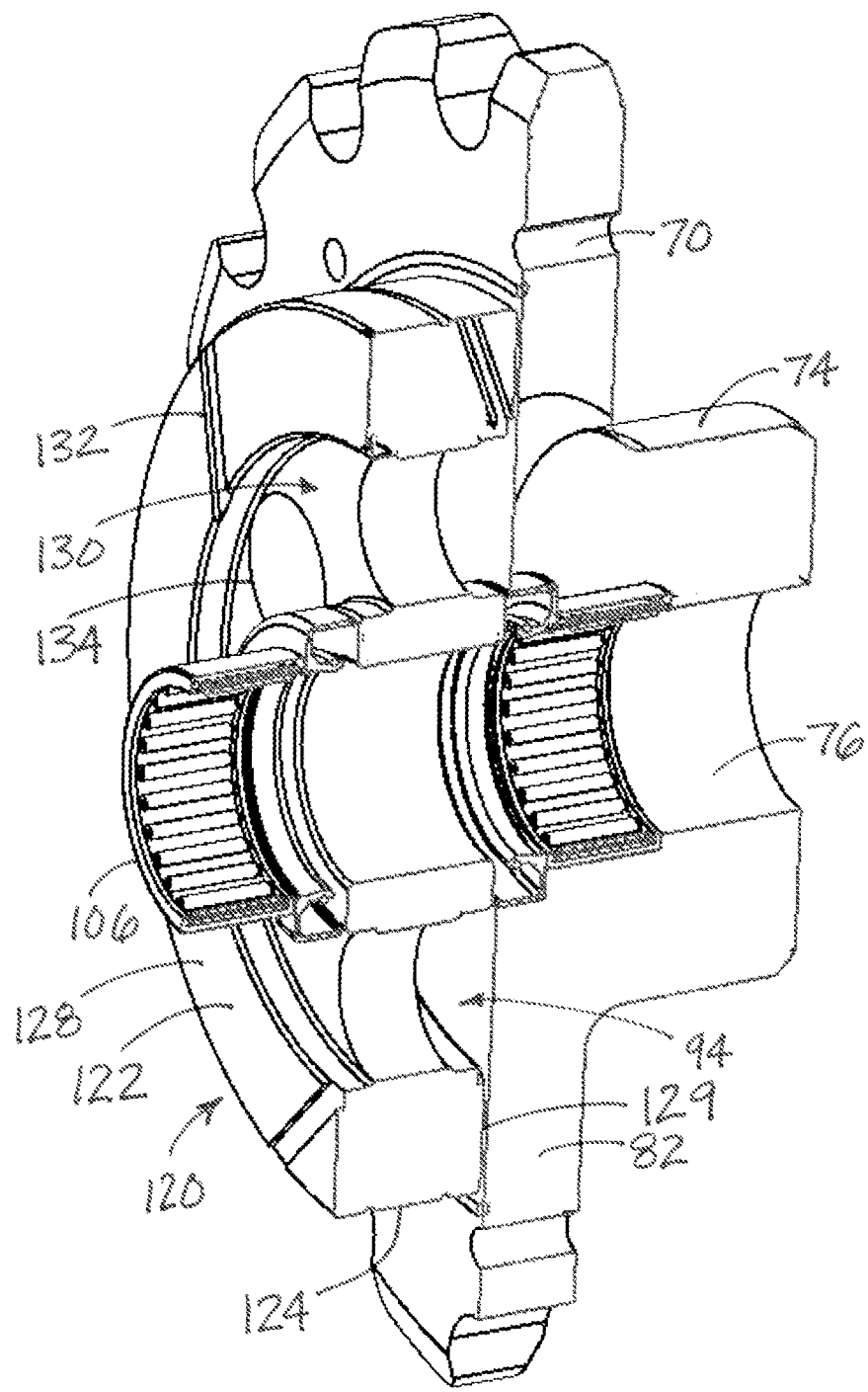
FIG. 16 is a schematic perspective sectional view of elements of the drive train of the bin sweep system including the second rotatable drive member and the clutch assembly with the second rotatable shaft and the driver shell omitted to reveal additional detail, according to an illustrative embodiment.
Figure 17:
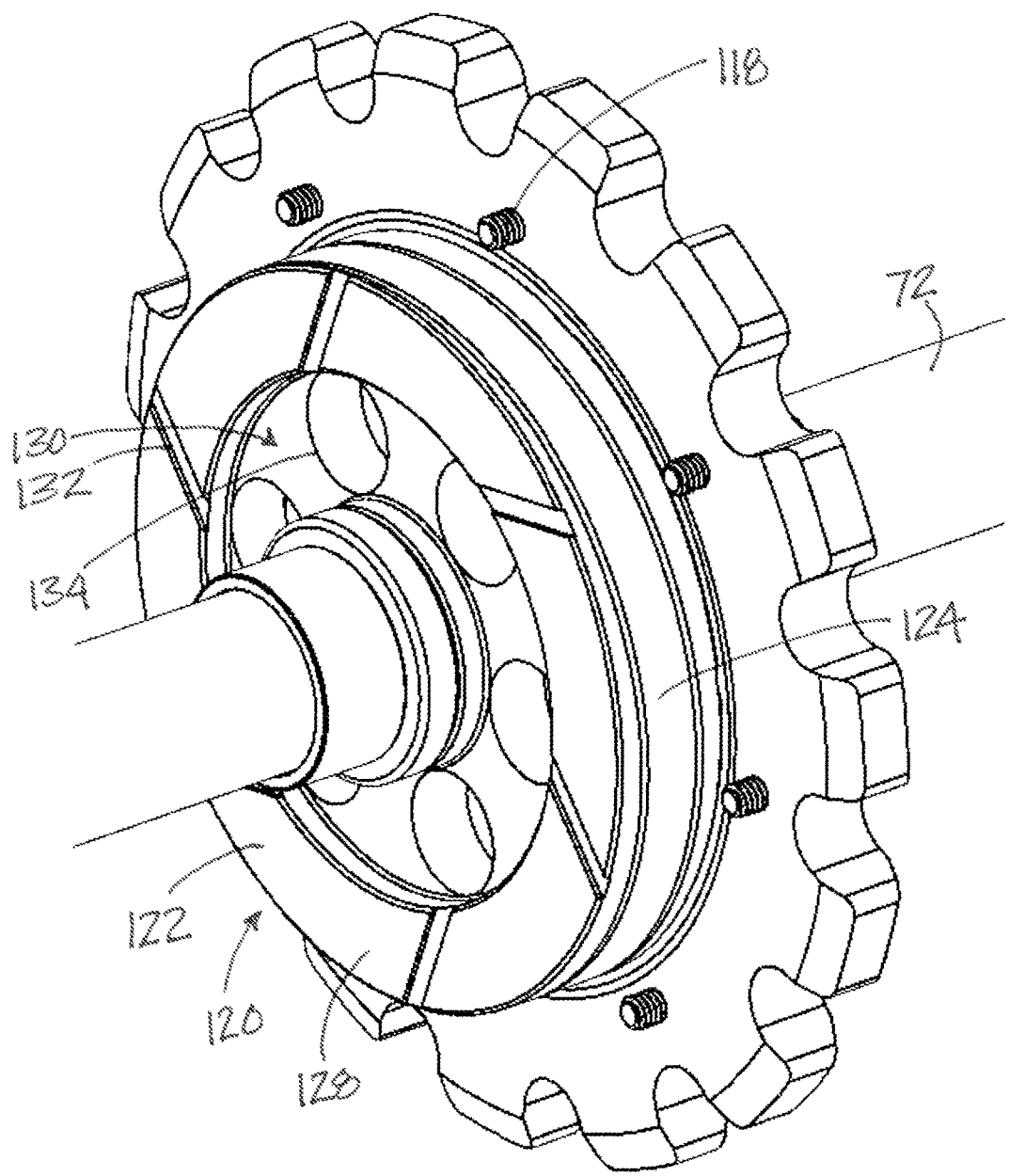
FIG. 17 is a schematic perspective view of elements of the drive train of the bin sweep system including the second rotatable drive member and the clutch assembly with the driver shell omitted to reveal detail, according to an illustrative embodiment.
Figure 18:
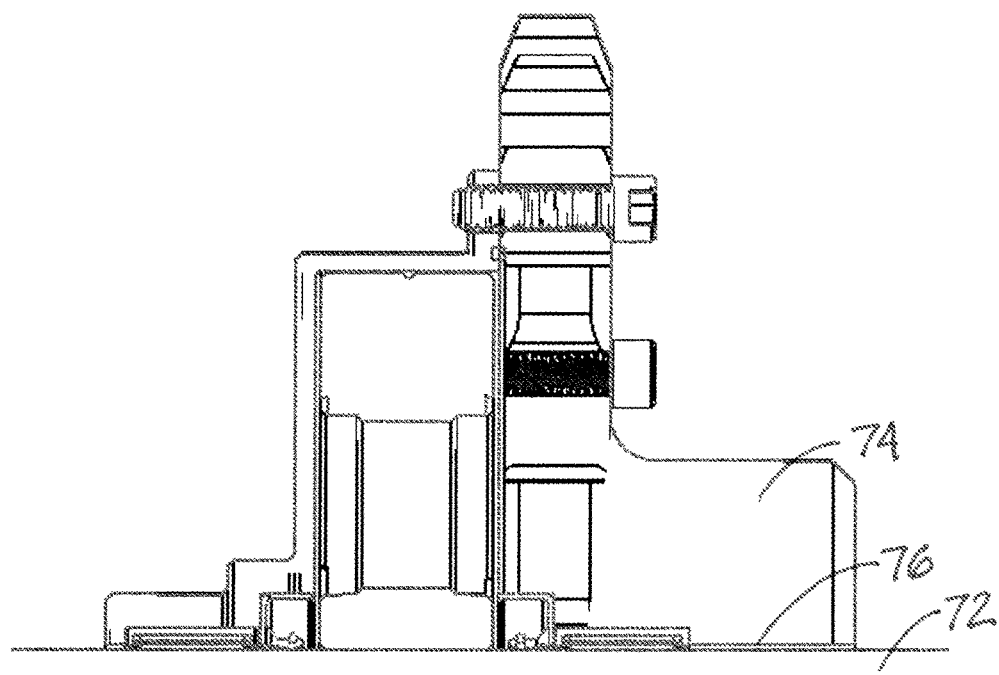
FIG. 18 is a schematic side sectional view of elements of the drive train of the bin sweep system including the second rotatable drive member, the second rotatable shaft, and the clutch assembly, according to an illustrative embodiment.
Figure 18:
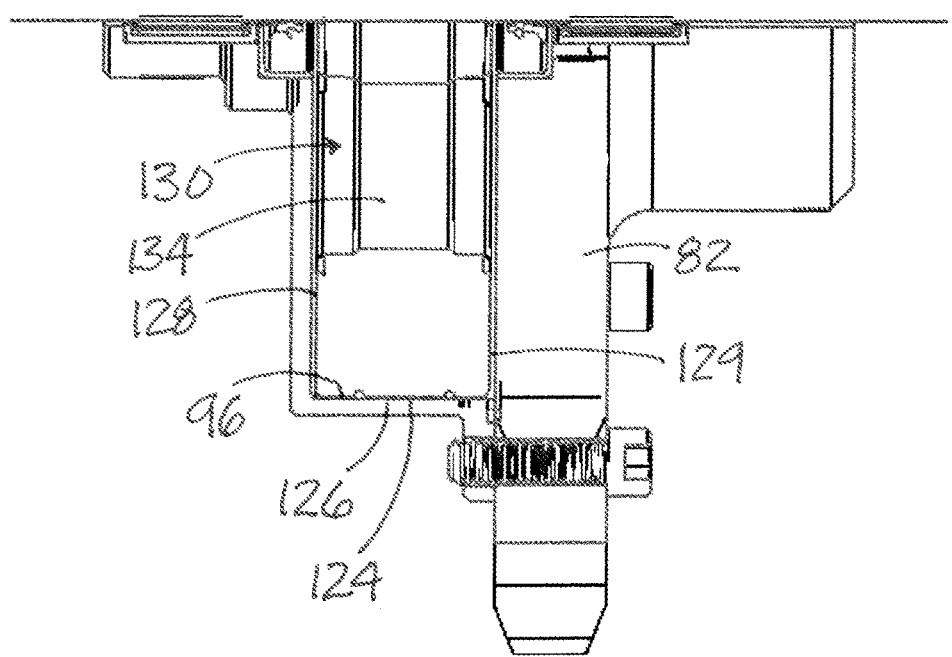
Figure 19:
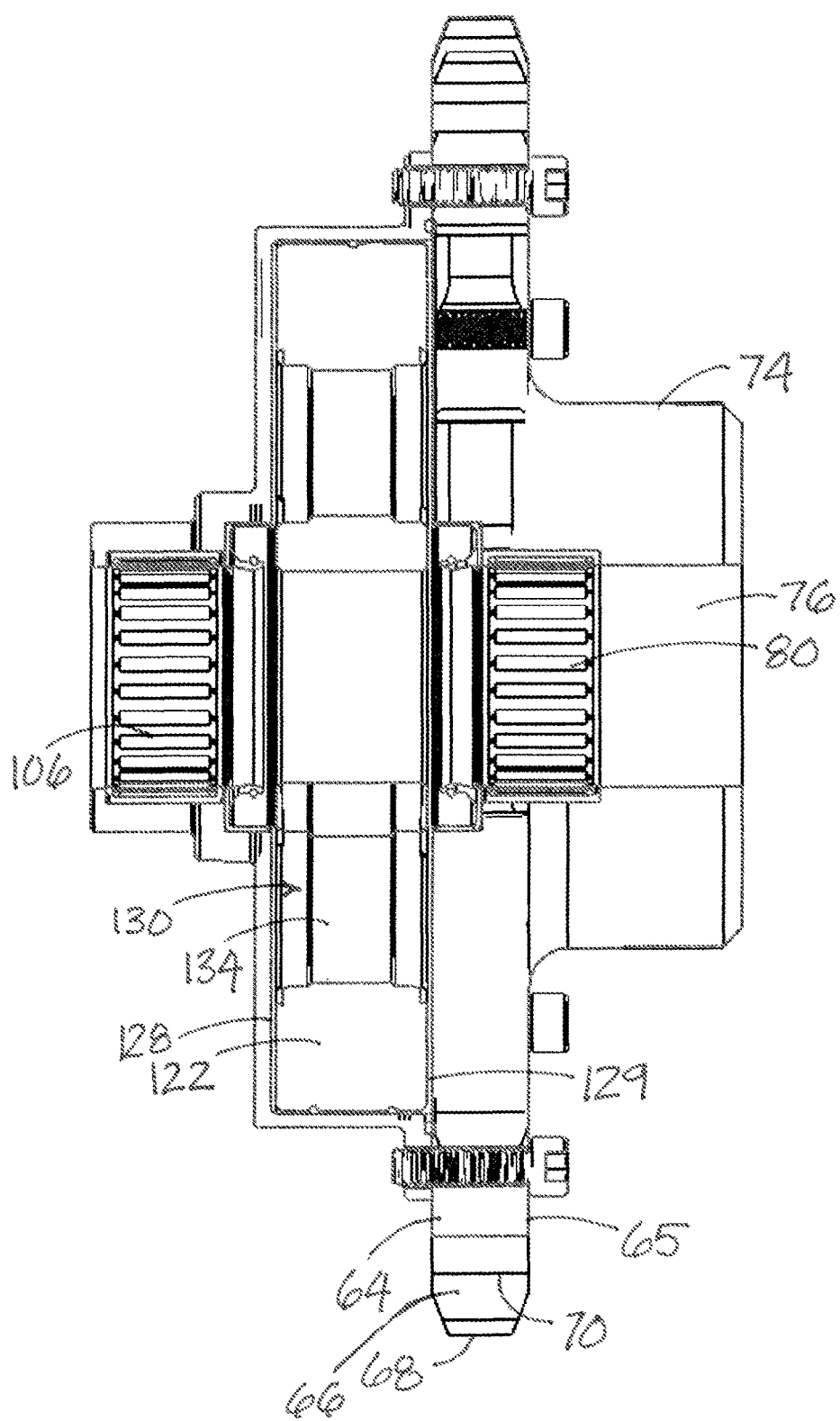
FIG. 19 is a schematic side sectional view of elements of the drive train of the bin sweep system including the second rotatable drive member and the clutch assembly with the second rotatable shaft omitted to reveal detail, according to an illustrative embodiment.

With reference now to the drawings, and in particular to FIGS. 1 through 22 thereof, a new bin sweep system with drive apparatus having enhanced slippage capability embodying the principles and concepts of the disclosed subject matter will be described.

Bin sweeps are often used to move the particulate contents about the interior of a storage bin, such as to facilitate removal of the contents from the storage bin. Bin sweeps typically operate by pushing up against the side of a grain pile in the interior of the bin, so that the forward side of the bin sweep is moved up against the pile and the elements used to engage and move the particles, such as paddles, are brought into contact with the particles at the periphery of the pile. The pile may be several feet in height, and the height of the pile at the periphery must be reduced to a sufficient degree before the sweep can further advance in the direction of the pile. A drive system mounted on the bin sweep typically maintains the forward side of the bin sweep, and the particle movement elements, in contact with the particles on the side of the pile by forcing the bin sweep to move toward and against the pile. However, the rate at which the bin sweep is able to advance or move is often dependent upon the height of the pile, and the taller the pile height the longer it takes to diminish the pile height sufficient to permit the bin sweep to move forward.

Since the rate at which the height of the pile is reduced varies, the rate at which the bin sweep is able to advance must also vary. Slippage of the wheels of the drive system on the floor may permit the pressure of the bin sweep against the pile to be maintained while still accommodating the variable rate at which the pile height diminishes and the sweep is able to advance. However, the slippage of the wheels on the floor may not be sufficient to allow the bin sweep to remain relatively stationary while the grain particles are carried inward and the pile diminished, and any grip of the wheels with the floor surface can impose a significant stress on the drive system, particularly when slipping wheels suddenly regain traction. Aside from accelerating the wear on the wheels (typically rubber tires), reliance upon wheel slippage alone can be damaging to the drive system, and more specifically the gears of the drive system, which may cause premature wear or even fracture of the gears of the drive train leading to a breakdown of the sweep apparatus. Specifically, the gears of the drive system may tend to be damaged when the wheels of the drive system do not slip on the floor to a degree sufficient to absorb the difference between the rate of travel at which the drive system is operating and the actual rate of travel of the bin sweep across the bin floor. Even when the wheels are slipping on the floor surface, the resistance to rotation by the slipping wheels is transferred through the elements of the drive system.

The potential for damage can be even greater in bin sweep systems that utilize the same source of rotational power to operate both the grain movement elements and the drive system, particularly since any attempt to decrease the speed of the drive system also necessarily requires a decrease in the speed of the grain movement elements and thus results in slowing of the rate at which the particulate matter or material is moved in the bin. Moreover, even in those bin sweep systems that utilize separate power sources for the grain movement elements and the drive system, intermittent slippage of the wheels on the floor surface can jar the drive train and particularly the gear sets utilized to rotate the wheels.

The applicants have discovered that providing a means of slippage in the drive system or drive train instead of, or in addition to, the wheel slippage on the floor surface significantly less than the stresses placed upon the elements of the drive train and have significant reliability and longevity benefits for the bin sweep system.

In one aspect, the disclosure relates to a storage bin sweep system 10 for moving particulate material across a floor surface of a storage bin, such as, for example, moving particles radially inwardly toward the center of the bin from locations spaced radially outwardly from the center. A sump may be located in the approximate center of the floor of the bin where the particulate material stored in the bin may be collected and transported out of the bin in any suitable manner, such as through a passage located below the bin floor which incorporates an apparatus for conveying the material.

The sweep system 10 may include a sweep apparatus 12 which may be comprised of at least two units 14 connected together in a linear array with respect to each other and positioned along a radial axis extending from the center of the bin outwardly. A longitudinal axis of the array of units may be substantially aligned with the radial axis of the storage bin. The sweep apparatus 12 may have an inboard end 18 for locating toward the center of the bin and an outboard end 19 for locating toward a peripheral area of the bin. The inboard end 18 may be positionable adjacent to the sump at the center of the bin floor. The sweep apparatus 12 may have a forward side 20 which is oriented toward the direction of movement of the apparatus during operation to move the particulate material, and the rearward side 21 oriented away from the direction of movement. Optionally, the units 14 may be removably connected together and the number of units between the inboard 18 and outboard 19 ends may be varied to adapt to the particular size and configuration of the storage bin such that, for example, the inboard end 18 is positioned adjacent to the center of the bin and the outboard end is located adjacent to the peripheral wall of the bin.

The sweep apparatus 12 may also include a plurality of interconnected paddles 22 which are movable in a succession on a path along at least a portion of the length of the sweep apparatus between the inboard 18 and outboard 19 ends. The path of the plurality of paddles 22 may be elongated along the longitudinal axis of the sweep apparatus between the inboard and outboard ends. The plurality of paddles 22 may be mounted on an endless loop member 24 at spaced locations along the endless loop. An active portion of the path of the paddles 22 may be positioned such that the paddles on the active portion are able to engage particulate material on the bin floor surface and move the particles across the floor surface, such as from the outboard to the inboard end. Another portion of the path of the paddles may be positioned such that the paddles on this inactive portion are not actively engaging the particulate material for movement across the floor surface, and instead the paddles of the inactive portion of the path are being transported from the inboard end to the outboard end, to then be moved to the active portion of the path. In some embodiments, the endless loop member 24 may comprise a series of interconnected links 26, and may take the form of a plurality of chain links such that the endless loop member is formed by a roller chain.

The units 14 of the sweep apparatus 12 may include a power unit 30 which carries a portion of the succession of interconnected paddles 22 and which is configured to move the plurality of paddles along the path defined by the sweep apparatus, such as between the outboard and inboard ends (and vice versa). The power unit 30 may be positioned toward one of the ends of the apparatus 12, and may be most suitably positioned at the inboard end 18 of the sweep apparatus.

The power unit 30 may include a first housing segment 32 which defines an interior in which a portion of the interconnected paddles are positioned. A portion of the endless loop member 24 may be engaged by a first rotatable drive member 34 which is rotatably mounted on the first housing segment 32. The first rotatable drive member 34 may comprise a first disk which engages the endless loop member 24, and in embodiments in which the endless loop member is a chain, the first disk may comprise a first sprocket on which the roller chain is entrained. The first rotatable drive member may be mounted on a first rotatable shaft 36 such that the drive member and the shaft rotate as a unit, preferably such that there is no slippage between the member 34 and the shaft 36. The rotatable shaft 36 may be rotatably mounted on the first housing segment 32, and the position of the shaft 36 (as well as the drive member 34) may be adjustable to adjust a degree of tension that is applied to the endless loop member 24 by these elements.

The power unit 30 may also include a motor assembly 40 which is configured to move the endless loop member 24 with respect to the first housing segment 32. The motor assembly 40 may be mounted on the first housing segment 32 and may include a motor 42 which is connected to the first rotatable drive member 34 via the first rotatable shaft 36 as well as a gearset 44 which may transfer rotational motion from the motor to the shaft 36.

The units 14 of the sweep apparatus 12 may also include a drive unit 50 which also carries a portion of the succession of interconnected paddles 22 and which is configured to move the sweep apparatus with respect to the bin floor surface below the apparatus. The drive unit 50 may be positioned toward the outboard end 19 of the array of units, and may be located at the outboard end, although the unit 50 may also be positioned at locations medial between the ends 18, 19. In many embodiments of the sweep apparatus 12, particularly those with relatively longer longitudinal length, multiple drive units 50 may be included in the apparatus 12 and may be configured with a drive unit at the outboard end 19 of the array of units, and at least one additional drive unit being positioned between the units at the inboard 18 and outboard 19 ends. Further, the units 14 of the sweep apparatus may include multiple drive units 30 located along the linear array. Typically, at least one intermediate unit 48 which is neither a power unit nor a drive unit may be positioned between the power 30 and drive 50 units.

The drive unit 50 of the sweep apparatus 12 may also include a second housing segment 52 which defines an interior in which a portion of the succession of interconnected paddles 22 may be positioned. The drive unit 50 may also include a surface engaging element 54 which is configured to engage a surface below the sweep assembly, such as the bin floor surface, to move the sweep apparatus with respect to the floor surface. The surface engaging element 54 may be mounted on or otherwise connected to the second housing segment 52, and may generally be located on the rearward side 21 of the sweep apparatus 12. The surface engaging element 54 may be engaged by the succession of interconnected paddles 22 in a material that drives the surface engaging element. In some embodiments, movement of the endless loop member 24 is employed to operate the surface engaging element 54 to produce the movement of the apparatus with respect to the floor surface.

In some illustrative embodiments, the surface engaging element 54 may comprise at least one surface engaging wheel 56, and optionally may comprise a pair of the surface engaging wheels. The wheel or wheels may be rotatable about a substantially horizontal axis which may be oriented substantially parallel to the longitudinal axis of the sweep apparatus as well as substantially parallel to the path of the interconnected paddles 22. An axle 58 may support the wheel or wheels 56 on the second housing segment.

The drive unit 50 may also include a drive train 60 which is configured to transmit power from the succession of interconnected paddles 22 to the surface engaging element such as the wheel or wheels 56. The drive train may include a second rotatable drive member 62 on which a portion of the endless loop member 24 is engaged. The second rotatable drive member 62 may be rotatable with respect to the second housing segment 52 and may be positioned in the interior of the segment 52. The second rotatable drive member 62 may comprise a second disk on which the endless loop member is entrained, and in those embodiments in which the endless loop member comprises a roller chain, the member 62 may comprise a second sprocket.

Illustratively, the second rotatable drive member 62 may have opposite lateral sides 64, 65 and a periphery 66 between the opposite lateral sides. In embodiments utilizing a chain as the loop member 24, the periphery 66 may form a plurality of teeth 68 positioned along the circumference of the drive member 62 which are suitable for engaging and entraining the loop member. A plurality of attachment holes 70 may be formed in the drive member which are configured to receive portions of fasteners, and the holes may be suitably threaded to engage threads on the fasteners.

The drive train 60 may also include a second rotatable shaft 72 which is rotatably mounted on the second housing segment 52 and which has the second rotatable drive member 62 connected thereto in a manner that permits the second rotatable drive member to rotate freely with respect to the second rotatable shaft 72. The second rotatable shaft 72 may be rotatable about a second rotation axis, and the second rotatable drive member 62 may also be rotatable about the second rotation axis. In some embodiments, the drive member 62 may include a hub portion 74 which defines a passage 76 through which the second rotatable shaft 72 passes. The hub portion may define a bearing chamber 78 in which a bearing 80 may be positioned to facilitate rotation of the drive member 62 with respect to the shaft 72. In addition to the hub portion, the drive member 62 may also include a disk portion 82 which extends radially outwardly from the hub portion 74. The plurality of attachment holes 70 may be formed in the disk portion 82.

The drive train 60 may also include various suitable rotation transmitting elements which connect the second rotatable shaft 72 to the axle 58 and surface engaging element or elements 54 of the drive unit. The rotation transmitting elements may include any suitable elements for transmitting rotational motion between the shaft 72 and axle 58, including, for example, a plurality of gears, sprockets connected by a chain, combinations thereof, and the like. Such elements may provide a degree of rotational speed reduction of the axle 58 with respect to the speed of the second rotatable shaft 72. For example, the wheels of drive units relatively closer to the inboard end do not need to rotate as fast as the wheels of drive units positioned relatively further from the inboard end of the sweep apparatus.

Significantly, the drive train 60 may include a clutch assembly 88 which is configured to selectively transfer rotation from the second rotatable drive member 62 to the second rotatable shaft 72, and effectively from the endless loop member 24 to the surface engaging element or elements 54. The clutch assembly 88 may thus permit a degree of slippage when resistance to rotation by the surface engaging wheel or wheels exceeds a threshold resistance. Advantageously, the clutch assembly 88 may permit the proportional application of torque (and rotation) to the drivetrains of drive units positioned at different locations along the longitudinal length of the sweep apparatus in proportion to the degree of rotation of the surface engaging element required by the position of the drive unit along the length of the sweep apparatus. Thus, the surface engaging elements of drive units relatively closer to the inboard end are permitted to rotate more slowly than surface engaging elements of drive units relatively further from the inboard end, typically in proportion to the relative distance of the drive units from the inboard end. Such variation of rotation can be produced despite using similar or substantially identical clutch assemblies on each drive unit along the length of the sweep apparatus. Further, slippage of the elements of the clutch assembly with respect to each other may occur without significant interruption of the continued application of torque between the elements of the clutch. Moreover, the transition to a slippage condition may occur with relatively less jerking or lurching of the elements of the drive train which may cause damage to the elements either immediately or over time through fatigue. Still further, movement of the sweep apparatus across the bin floor surface may be faster when the particulate material on the bin floor surface has been reduced and the resistance to movement of the sweep apparatus is lessened.

The clutch assembly 88 may include a driver element 90 which is associated with the second rotatable drive member 62 such that the driver element rotates as a unit with the drive member 62. The driver element 90 may form a driver shell 92 which defines a cavity 94 which may be located between the driver shell 92 and the second rotatable drive member 62. The cavity 94 may be configured to hold the quantity of a viscous liquid. The cavity 94 may be at least partially defined by a driver surface 96 on the driver shell 92, and the surface 96 may be annular and substantially cylindrical in shape. The driver shell 92 may be mounted on the second rotatable drive member 62, and may be positioned adjacent to one of the opposite lateral sides 64 of the second disk of the drive member 62 such that the drive member 62 forms or defines a portion of the cavity 94. The driver shell 92 may further have an interior face 98 which is located opposite of the lateral side 64 of the second rotatable drive member.

In some embodiments, the driver shell 92 may include a driver hub 100 which may define a passage 102 through which the second rotatable shaft 72 extends, and the driver hub may define a bearing chamber 104 in which a bearing 106 is located to facilitate rotation of the driver shell 92 with respect to the shaft 72. The driver shell may further include a driver wall 108 which extends radially outwardly from the driver hub 100 and which may have an outer perimeter 110. The driver shell 92 may further include a perimeter wall 112 which forms the driver surface 96 of the driver element 90. The perimeter wall 112 may extend from the outer perimeter 110 of the driver wall. The driver shell 92 may still further include an annular flange 114 which extends radially outwardly from the perimeter wall 112 and may be oriented substantially parallel to the driver wall. A plurality of attachment holes 116 may be formed in the annular flange 114 which may be alignable with the plurality of attachment holes 70 formed in the second disk of the second rotatable drive member 62 such that a plurality of fasteners 118 may be extended into the holes 116 and holes 70 to fasten the annular flange of the driver shell 92 to the drive member 62 so that the driver shell and the drive member rotate as a unit and collectively enclose the cavity 94.

The clutch assembly 88 may further include a driven element 120 which is associated with the second rotatable shaft 72 in a manner such that the driven element 120 and the shaft 72 rotate as a unit. The driven element 120 may be at least partially positioned in the cavity 94 of the driver element 90. The driven element 120 may form a driven disk 122 which may have a driven surface 124 positioned in opposition to the driver surface 196 of the driver shell. The driven surface 124 may be generally annular and may be substantially cylindrical in shape. The driver surface 96 and the driven surface 124 may form a gap 126 into which the viscous fluid is able to flow. The driven disk 122 may have opposite sides 120, 129 with the driven surface 124 being located between the opposite sides of the disk 122. Illustratively, the driven disk 124 may define an interior chamber 130 which is located radially inwardly from the driven surface 124, and the interior chamber may be located on one of the opposite sides 128, 129 of the driven disk. In some embodiments, the driven disk may define a plurality of channels 132 which extend from the interior chamber 130 to the driven surface 124. The channels 132 may be oriented skewed to a radial line extending outwardly from the second rotation axis. A plurality of openings 134 may extend between the interior chamber 130 and one of the sides 128, 129 of the driven disk which is located opposite of the site on which the interior chamber is located. In some embodiments, each of the channels 132 extends from a respective one of the openings 134 to facilitate movement of the viscous fluid outwardly from the interior chamber to the gap 126 between the driver surface and the driven surface.

In operation, the viscous fluid within the clutch assembly, and in particular the portion of the fluid positioned between the driver surface 96 on the driver element 90 and the driven surface 124 on the driven element 120, tends to cause the driven element to rotate with the driver element to thereby transfer the rotational motion of the driver element to the driven element. The tendency of the driven element to rotate with the driver element is a result of the resistance of the viscous fluid to the shear forces applied by the rotating driver element to the fluid if the driven element does not rotate with the driver element. The viscosity of the fluid and the areas of the driver 96 and driven 124 surfaces should be suitable to produce the optimal degree of transfer rotational motion from the driver element 90 to the driven element 120 with relatively minimal resistance to slippage when conditions in the bin allow the wheel or wheels to rotate relatively freely. The viscosity of the fluid and the areas of the driver in driven surfaces may also be suitably selected to permit a degree of slippage between the driver element and the driven element when conditions impose additional resistance to the rotation of the wheel or wheels which may be destructive or highly fatiguing to elements of the drive train between the second rotatable drive member 62 and the wheel 56. Such slippage may be complete in that no rotational motion is transferred from the driver element to the driven element, or may only be a partial slippage that causes the driven element to rotate at a fraction of the speed of the driver element. Advantageously, the transfer rotational motion or movement between the driver element and the driven element occurs without direct contact between these elements which may lead to wear of one or both of the elements, as well as potential failure, due to friction between the elements resulting from direct contact.

Figure 20:
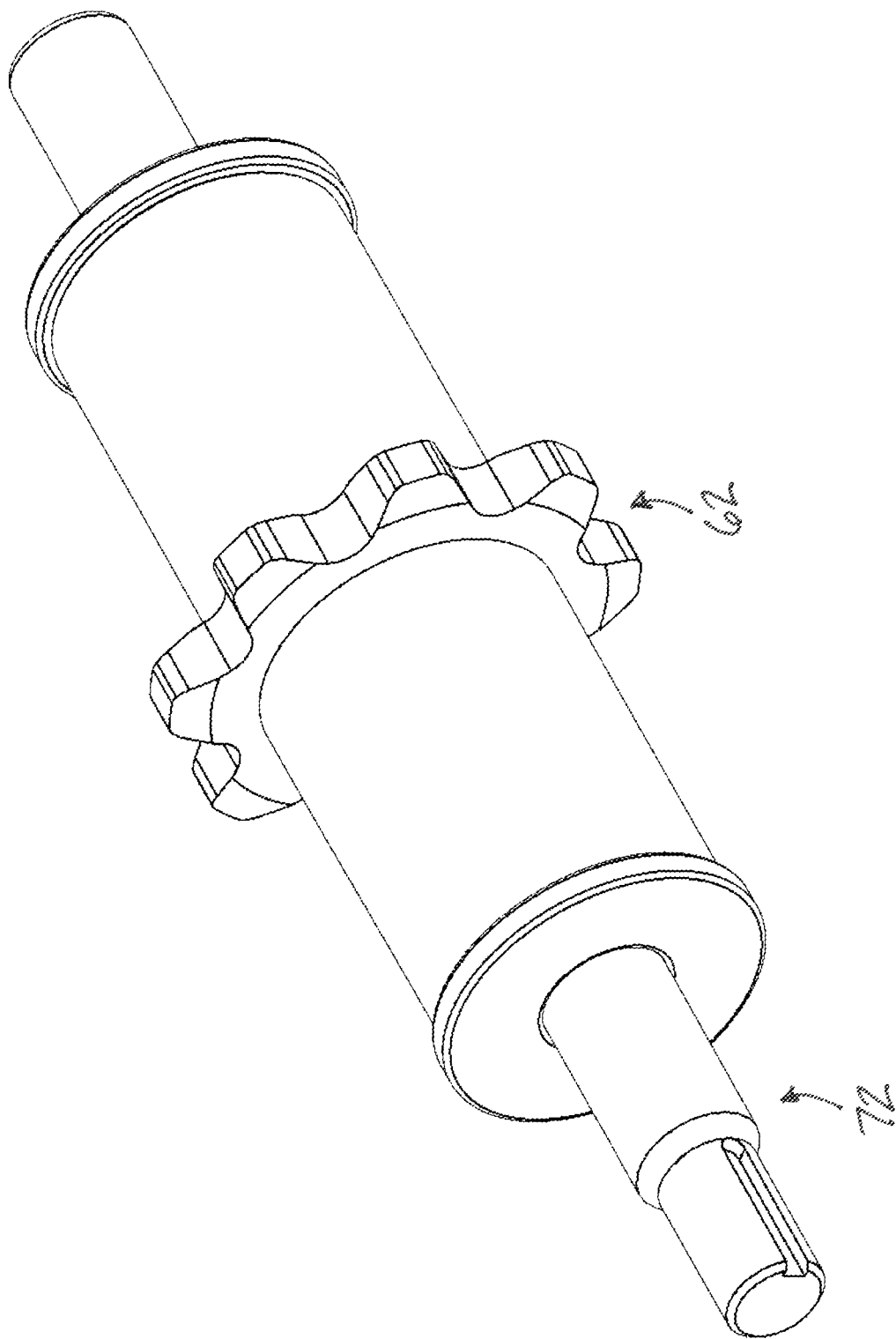
FIG. 20 is a schematic perspective view of an optional configuration of elements of the drive train of the bin sweep system, according to an illustrative embodiment.

In some applications, the overall diameter width of the second rotatable drive member 62, or sprocket, may be limited by the space available, for example, in the interior of the second housing segment 52, and a corresponding limitation may be placed upon the clutch assembly 88 and more specifically on the diameter of the driver surface 96 and the driven surface 124 of the respective elements 90 and 120. In order to maintain a sufficient degree of resistance to slippage between the driver and driven elements, a suitable area for the driver surface 96 and driven surface 124 may be provided by increasing the axial dimension (e.g., in the direction of the rotational axis) of the surfaces to compensate for a reduction in the diameter dimension of the surfaces. An illustrative embodiment having the driver and driven surfaces enlarged in the axial direction is depicted in FIGS. 20 through 22. In such an embodiment, the driver element 90 may have a drum-like configuration with the second rotatable drive member 62 mounted on the exterior and the driver surface 96 formed on the interior. The driven element 120 may be effectively encased within the driver element with the driven surface 124 positioned in opposition to the driver surface 96. The size of the drum-like configuration in the axial direction on the second rotatable shaft 72 may be increased or decreased to provide a suitable degree of slippage between the driver and driven surfaces caused by the viscous liquid therebetween. Suitable seals and bearings may be provided to retain the viscous fluid as well as permitting rotation of one element with respect to the other element when slippage is needed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A storage bin sweep system for moving particulate material across a floor surface of a bin, the system comprising:
   a sweep apparatus including at least two units and having an inboard end for locating toward to a central area of the bin and an outboard end for locating toward a peripheral area of the bin, the sweep apparatus comprising:
   a particulate material moving assembly configured to move particulate material toward the inboard end of the sweep apparatus;
   a drive unit carrying a portion of the particulate material moving assembly, the drive unit being positioned toward the outboard end of the sweep apparatus with respect to the inboard end, the drive unit comprising:
   a surface engaging element configured to engage a surface below the sweep assembly to move the sweep apparatus with respect to the surface; and
   a drive train configured to transmit power to the surface engaging element, the drive train including a clutch assembly configured to transfer rotation utilizing a viscous fluid to permit a limited degree of slippage between elements of the drive train.

2. The system of claim 1 wherein the particulate material moving assembly comprises a plurality of interconnected paddles movable in a succession on a path along at least a portion of the sweep apparatus between the inboard and outboard ends, the plurality of paddles being mounted on an endless loop member at spaced locations along the endless loop.

3. The system of claim 2 wherein the drive unit carries a portion of the endless loop member and the succession of interconnected paddles, the endless loop member engaging the drive train to move the sweep apparatus with respect to a surface below the sweep apparatus.

4. The system of claim 3 wherein the drive unit includes a housing segment; and
   wherein the surface engaging element includes an axle rotatable with respect to the housing segment of the drive unit.

5. The system of claim 4 wherein the surface engaging element additionally includes at least one surface engaging wheel mounted on the axle to rotate with respect to the housing segment.

6. The system of claim 4 wherein the drive train comprises:
   a rotatable shaft rotatably mounted on the housing segment of the drive unit and being in rotational communication with the axle of the surface engaging element such that rotation of the rotatable shaft of the drive train rotates the axle of the surface engaging element;
   a rotatable drive member mounted on the rotatable shaft in a manner permitting free rotation of the rotatable drive member with respect to the rotatable shaft, a portion of the endless loop member being engaged with the rotatable drive member such that movement of the endless loop member is able to rotate the rotatable drive member; and
   wherein the clutch assembly is configured to transfer rotation from the rotatable drive member to the shaft.

7. The system of claim 6 wherein the clutch assembly comprises:
   a driver element associated with the rotatable drive member to rotate as a unit with the rotatable drive member, the driver element forming a driver shell defining a cavity, the cavity being at least partially defined by a driver surface; and
   a driven element associated with the rotatable shaft to rotate as a unit with the rotatable shaft, the driven element being at least partially positioned in the cavity of the driver element, the driven element forming a driven disc, the driven disc having a driven surface positioned in opposition to the driver surface of the driver shell of the driver element;
   wherein the driver surface of the driver element and the driven surface of the driven element form a gap in which a viscous fluid is located to tend to cause the driven element to rotate with the driver element to thereby transfer rotational motion of the driver element to the driven element.

8. The system of claim 7 wherein the driver surface of the driver element is positioned radially outwardly from the driven surface of the driven element.

9. The system of claim 8 wherein the driven disc of the driven element defines an interior chamber located radially inwardly from the driven surface, the driven disc defining a plurality of channels extending from the interior chamber to the driven surface.

10. The system of claim 9 wherein the interior channels in the driven disc are oriented skewed to a radial line from an axis of rotation of the driven disc.

11. The system of claim 7 wherein the driver surface is annular in shape and the driven surface is annular in shape.

12. The system of claim 7 wherein the driver shell of the driver element is mounted on the rotatable drive member to define the cavity therebetween such that the driven disk of the driven element is positioned between the driver shell and the rotatable drive member.

13. A storage bin sweep system for moving particulate material across a floor surface of a bin, the system comprising:
   a sweep apparatus including at least two units and having an inboard end for locating toward to a central area of the bin and an outboard end for locating toward a peripheral area of the bin, the sweep apparatus comprising:
   a particulate material moving assembly configured to move particulate material toward the inboard end of the sweep apparatus;
   a drive unit carrying a portion of the particulate material moving assembly, the drive unit being positioned toward the outboard end of the sweep apparatus with respect to the inboard end, the drive unit comprising:
   a housing segment of the drive unit;
   a surface engaging element configured to engage a surface below the sweep assembly to move the sweep apparatus with respect to the surface, the surface engaging element including a rotatable axle mounted on and rotatable with respect to the housing segment of the drive unit; and a drive train configured to transmit power from the particulate material moving assembly to the surface engaging element, the drive train including:

a rotatable shaft rotatably mounted on the housing segment of the drive unit and being in rotational communication with the axle of the surface engaging element such that rotation of the rotatable shaft of the drive train rotates the axle of the surface engaging element;

a rotatable drive member mounted on the rotatable shaft in a manner permitting free rotation of the rotatable drive member with respect to the rotatable shaft, the rotatable drive member being engaged with the particulate material moving assembly such that the particulate material moving assembly rotates the rotatable drive member; and a clutch assembly for transferring rotation from the rotatable drive member to the rotatable shaft, the clutch assembly comprising:

a driver element associated with the rotatable drive member to rotate as a unit with the rotatable drive member, the driver element forming a driver shell defining a cavity, the cavity being at least partially defined by a driver surface; and a driven element associated with the rotatable shaft to rotate as a unit with the rotatable shaft, the driven element being at least partially positioned in the cavity of the driver element, the driven element forming a driven disc, the driven disc having a driven surface positioned in opposition to the driver surface of the driver shell of the driver element;

wherein the driver surface of the driver element and the driven surface of the driven element form a gap in which a viscous fluid is located to tend to cause the driven element to rotate with the driver element to thereby transfer rotational motion of the driver element to the driven element.

14. The system of claim 13 wherein the driver surface of the driver element is positioned radially outwardly from the driven surface of the driven element.

15. The system of claim 14 wherein the driven disc of the driven element defines an interior chamber located radially inwardly from the driven surface, the driven disc defining a plurality of channels extending from the interior chamber to the driven surface.

16. The system of claim 15 wherein the interior channels in the driven disc are oriented skewed to a radial line from an axis of rotation of the driven disc.

17. The system of claim 13 wherein the driver surface is annular in shape and the driven surface is annular in shape.

* * * * *